United States Patent
Park

(10) Patent No.: US 10,511,798 B2
(45) Date of Patent: Dec. 17, 2019

(54) METHOD FOR TRANSMITTING AND RECEIVING POWER USING HDMI AND APPARATUS THEREFOR

(71) Applicant: LG ELECTRONICS INC., Seoul (KR)

(72) Inventor: Jangwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 152 days.

(21) Appl. No.: 15/550,616

(22) PCT Filed: Jun. 3, 2016

(86) PCT No.: PCT/KR2016/005931
§ 371 (c)(1),
(2) Date: Aug. 11, 2017

(87) PCT Pub. No.: WO2016/195429
PCT Pub. Date: Dec. 8, 2016

(65) Prior Publication Data
US 2018/0054589 A1  Feb. 22, 2018

Related U.S. Application Data

(60) Provisional application No. 62/170,707, filed on Jun. 4, 2015.

(51) Int. Cl.
*H04N 5/765* (2006.01)
*G09G 5/00* (2006.01)
(Continued)

(52) U.S. Cl.
CPC ............. *H04N 5/765* (2013.01); *G09G 3/20* (2013.01); *G09G 5/00* (2013.01); *G09G 5/006* (2013.01);
(Continued)

(58) Field of Classification Search
CPC ........ H04N 5/765; H04N 5/4401; G09G 3/20; G09G 5/00; G09G 5/006; G09G 5/008;
(Continued)

(56) References Cited

U.S. PATENT DOCUMENTS 9,819,995 B2 * 11/2017 Park ................. H04N 21/43635
10,038,871 B2 * 7/2018 Park .......................... G06F 1/26
(Continued)

FOREIGN PATENT DOCUMENTS

CN      101753968 A    6/2010
CN      101755249 A    6/2010
(Continued)

OTHER PUBLICATIONS

Confidential, "High-Definition Multimedia Interface Specification Version 2.0", HDMI Forum, Sep. 4, 2013, pp. 1-245, XP055388172.

*Primary Examiner* — Michael Lee
(74) *Attorney, Agent, or Firm* — Birch, Stewart, Kolasch & Birch, LLP

(57) ABSTRACT

A method for supplying and receiving, by a sink device, power using an HDMI may include being connected to a source device through the HDMI, receiving a +5 V signal, transmitting an HPD signal, transmitting EDID information including power delivery support information or power delivery request information of the sink device, receiving a first SCDC write message including required power characteristic information indicative of a first power level requested by the source device from the sink device, writing the required power characteristic information in the power delivery configuration registers of an SCDCS, writing support power characteristic information indicative of a second power level capable of being supplied by the sink device in the status flag register of the SCDCS, transmitting the written support power characteristic information to the (Continued)

source device, and transmitting the power of the second power level to the source device.

15 Claims, 23 Drawing Sheets

(51) Int. Cl.
    *G09G 3/20*     (2006.01)
    *G09G 5/12*     (2006.01)
    *H04N 5/44*     (2011.01)
    *H02J 7/00*     (2006.01)

(52) U.S. Cl.
    CPC .............. *G09G 5/008* (2013.01); *G09G 5/12* (2013.01); *H02J 7/0004* (2013.01); *H04N 5/4401* (2013.01); *G09G 2370/042* (2013.01); *G09G 2370/10* (2013.01); *G09G 2370/12* (2013.01); *H02J 7/0054* (2013.01)

(58) Field of Classification Search
    CPC .............. G09G 5/12; G09G 2370/042; G09G 2370/10; G09G 2370/12; H02J 7/0004; H02J 7/0054
    USPC ......................................................... 348/706
    See application file for complete search history.

(56) References Cited

U.S. PATENT DOCUMENTS

| | | | |
|---|---|---|---|
| 2012/0080954 A1 | 4/2012 | Gachon et al. | |
| 2016/0127771 A1* | 5/2016 | Pasqualino | H04N 21/43635 348/474 |
| 2016/0323554 A1* | 11/2016 | Oh | H04N 7/015 |
| 2017/0238051 A1* | 8/2017 | Park | H04N 21/43635 348/730 |
| 2017/0347052 A1* | 11/2017 | Lin | H04N 21/43635 |

FOREIGN PATENT DOCUMENTS

| | | |
|---|---|---|
| CN | 101925873 A | 12/2010 |
| CN | 102422638 A | 4/2012 |
| EP | 2 172 831 A1 | 4/2010 |
| JP | 2009-44706 A | 2/2009 |
| JP | 2012-524317 A | 10/2012 |
| KR | 10-2006-0092970 A | 8/2006 |
| KR | 10-2009-0046275 A | 5/2009 |
| KR | 10-2010-0114034 A | 10/2010 |
| KR | 10-2010-0136695 A | 12/2010 |
| WO | WO 2014/061145 A1 | 4/2014 |

* cited by examiner

[Fig. 1]
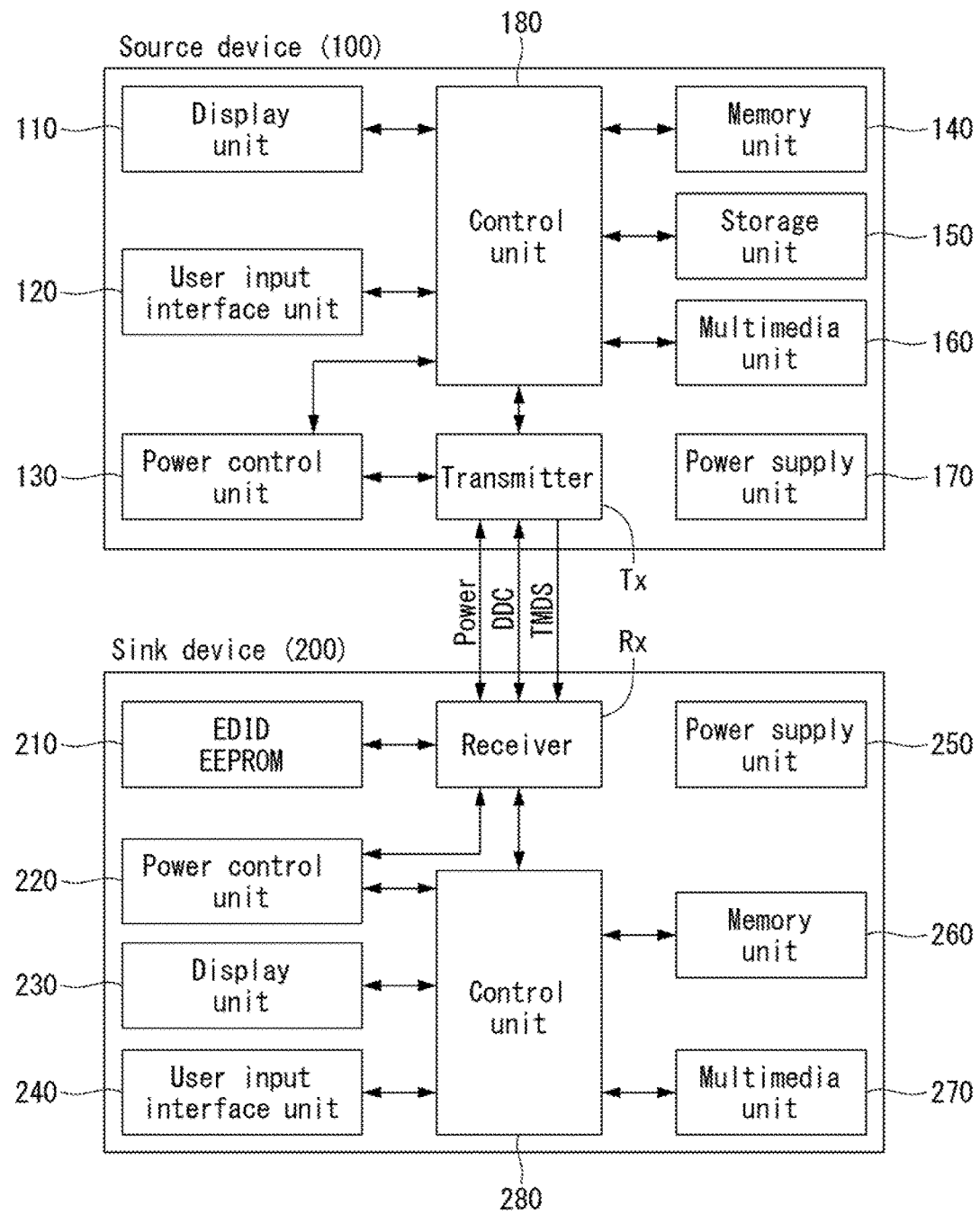

[Fig. 2]
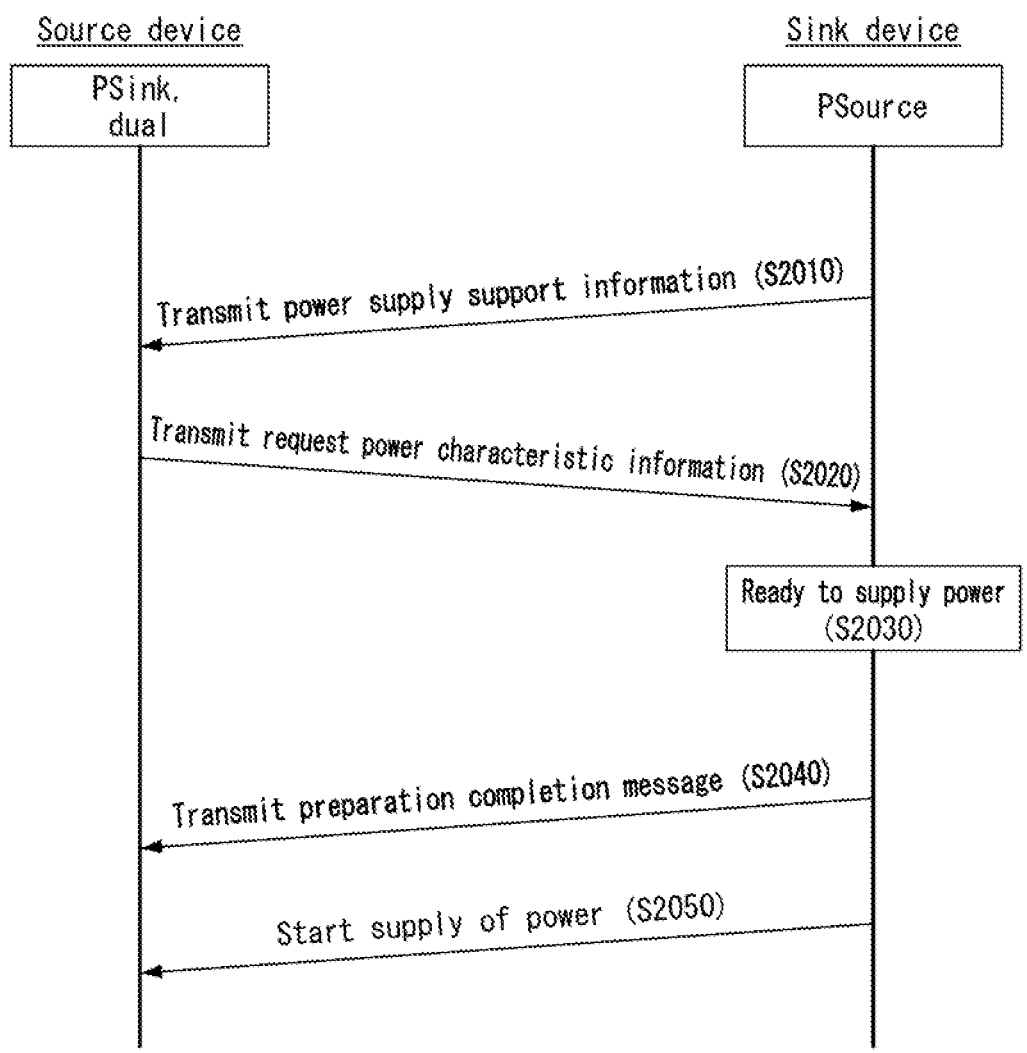

[Fig. 3]
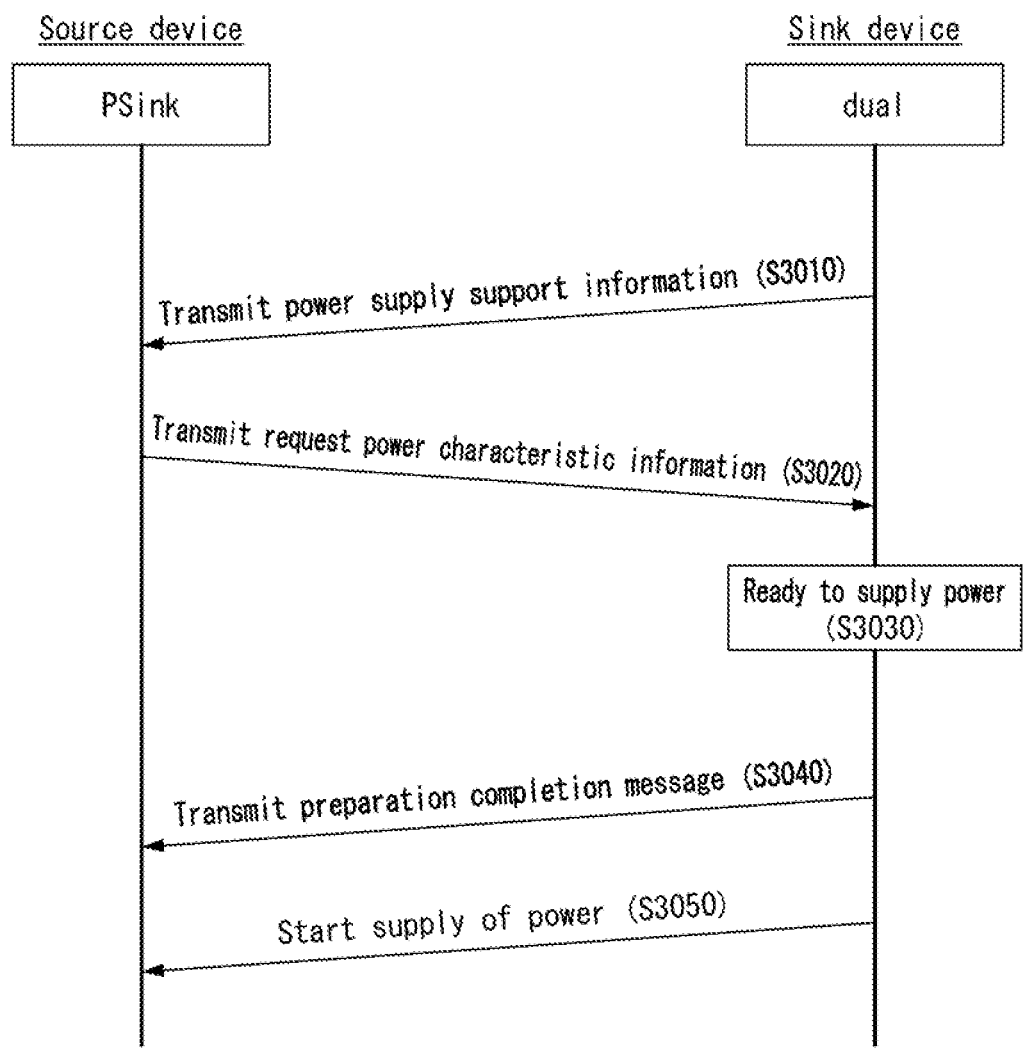

[Fig. 4]
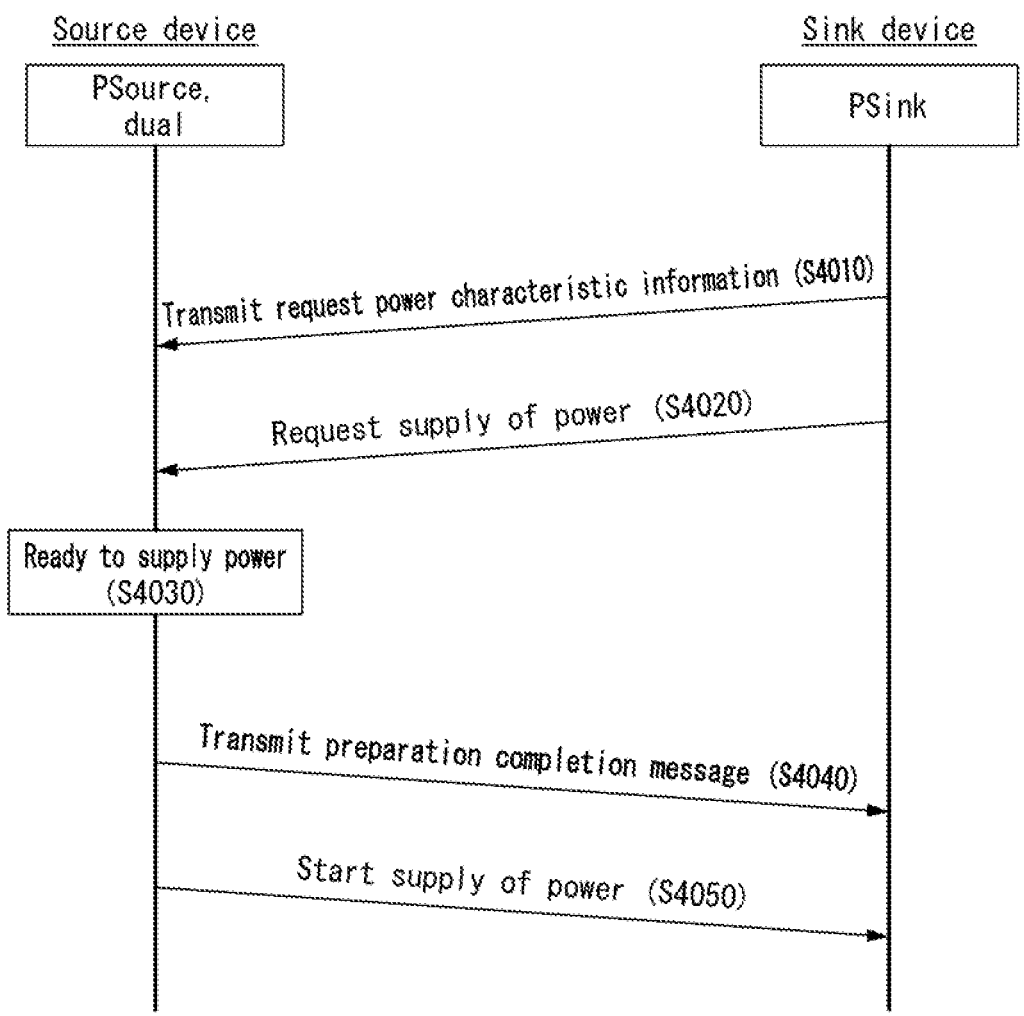

[Fig. 5]
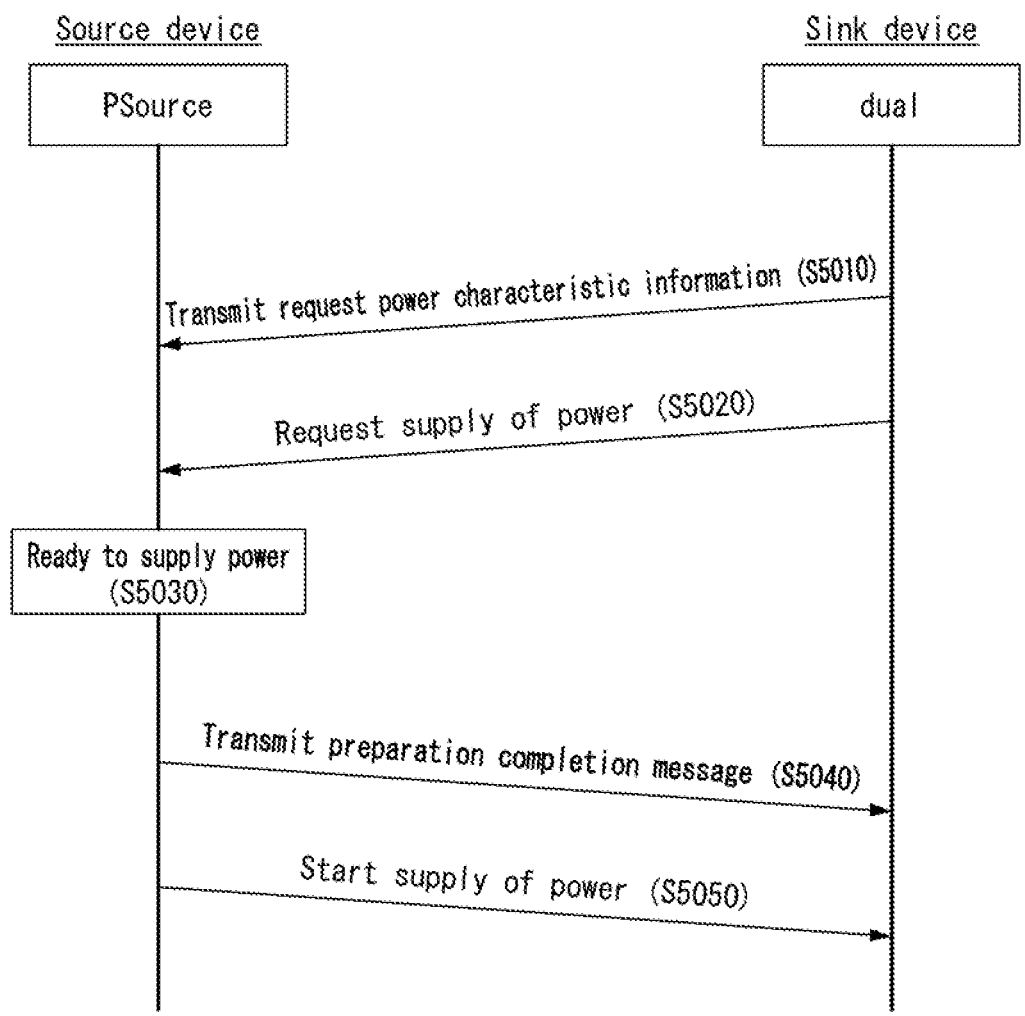

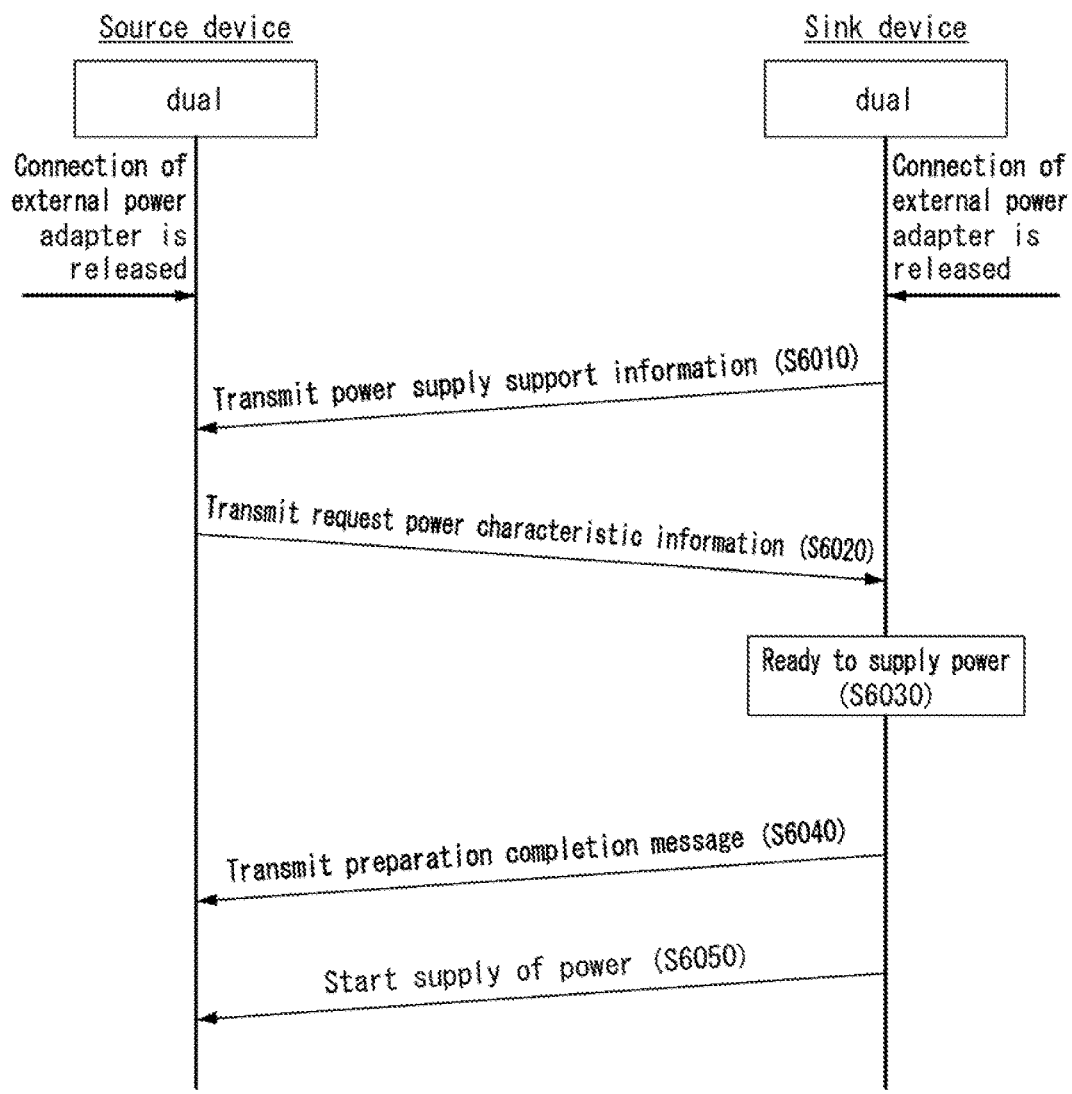
[Fig. 6]

[Fig. 7]
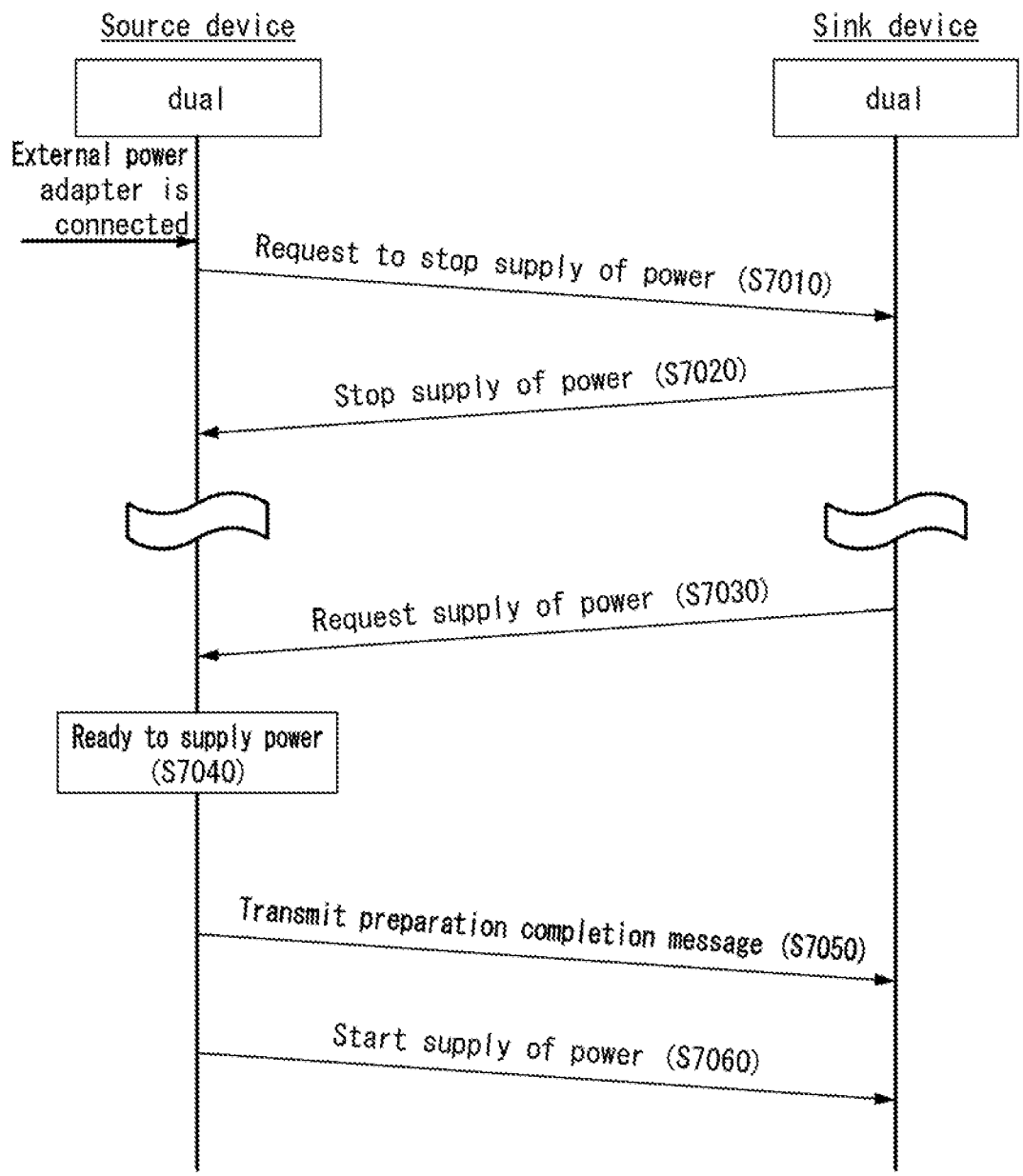

[Fig. 8]
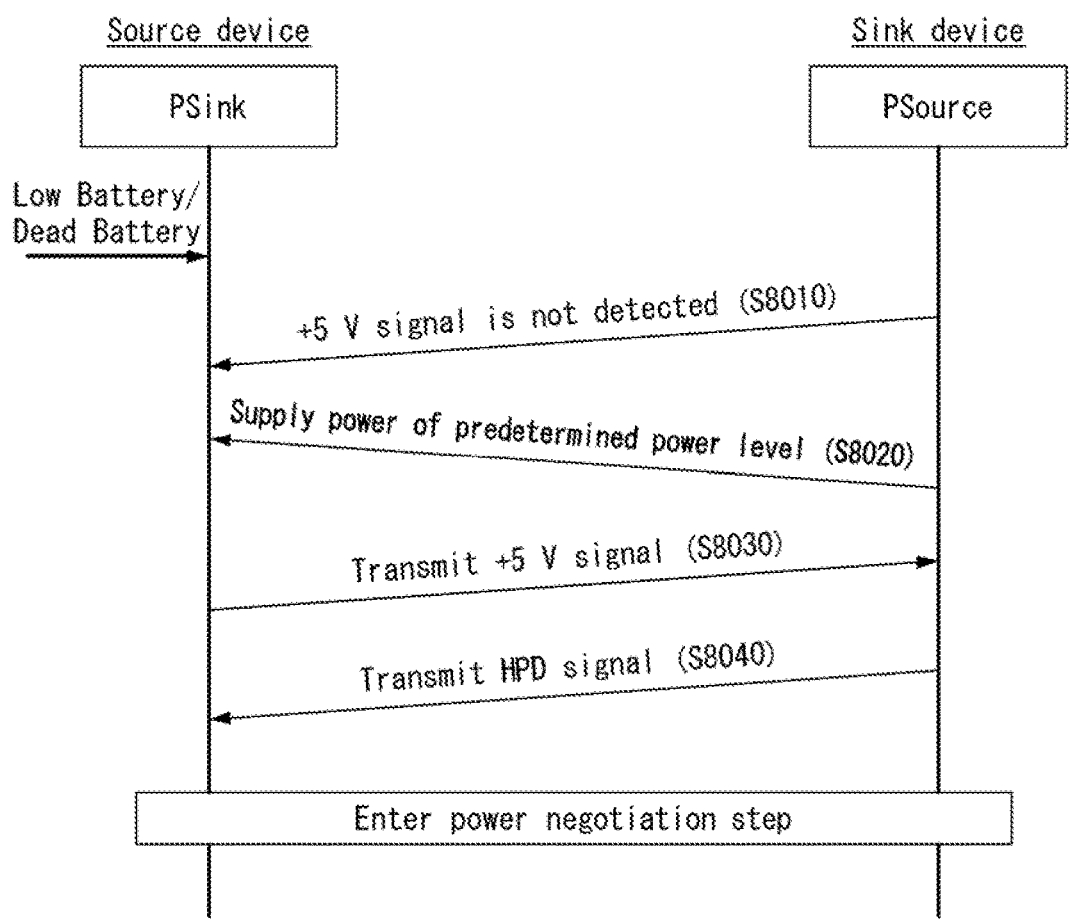

[Fig. 9]
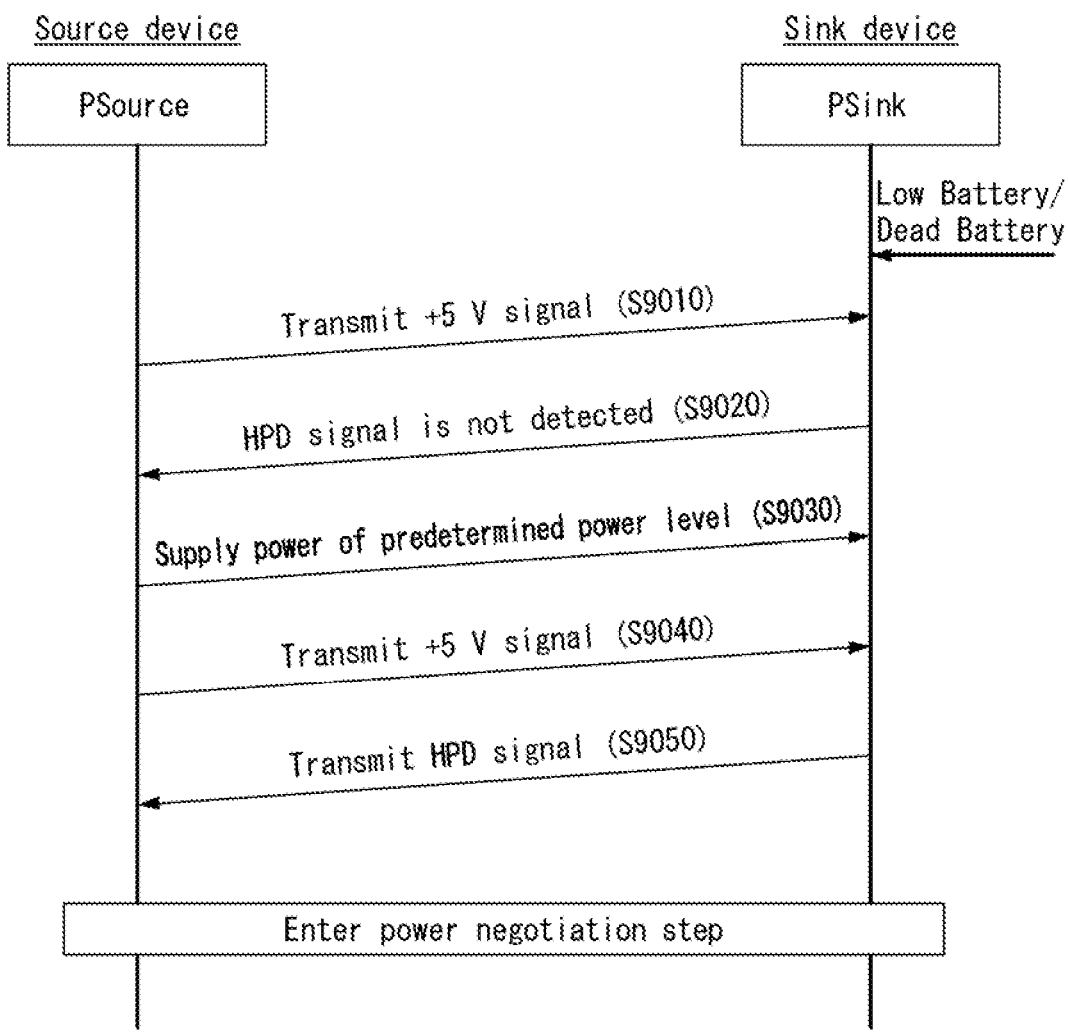

[Fig. 10]
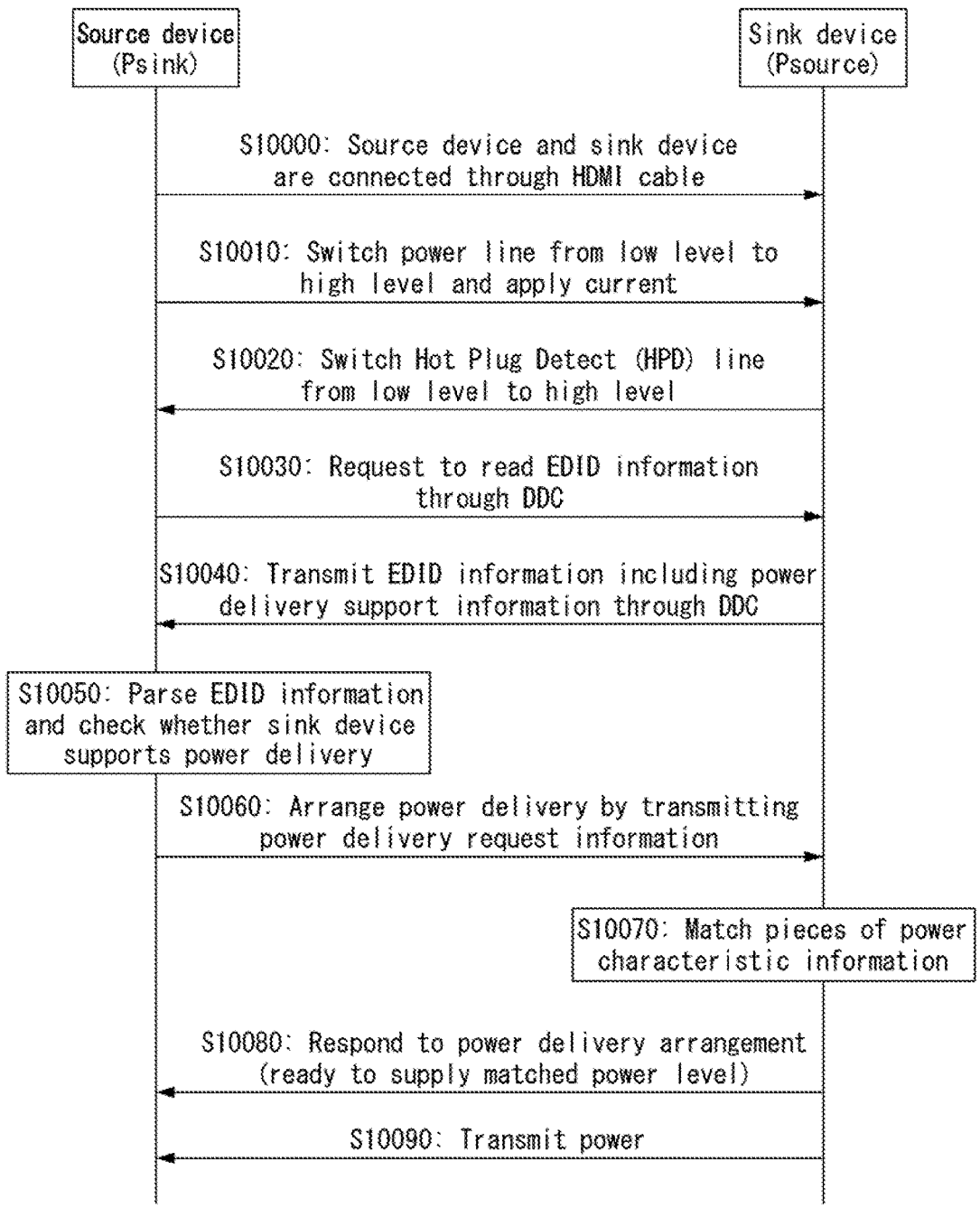

[Fig. 11]
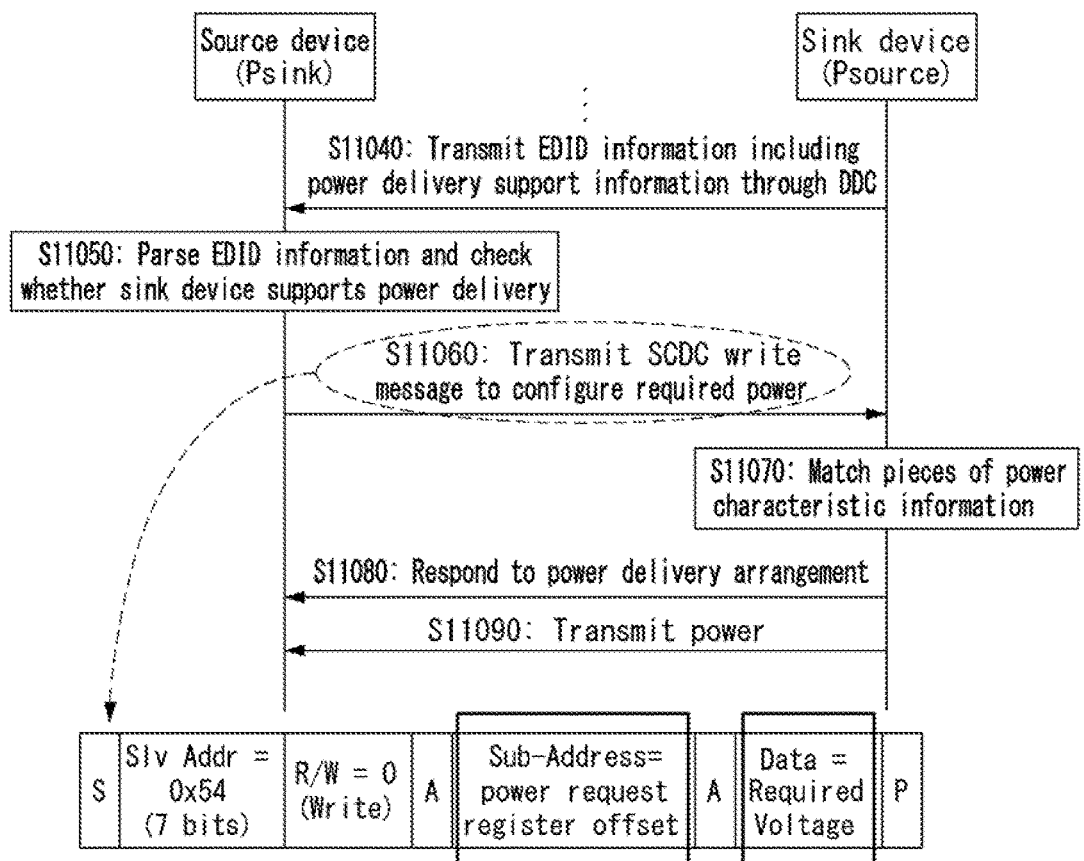
(a) SCDC write message for configuring power characteristic information
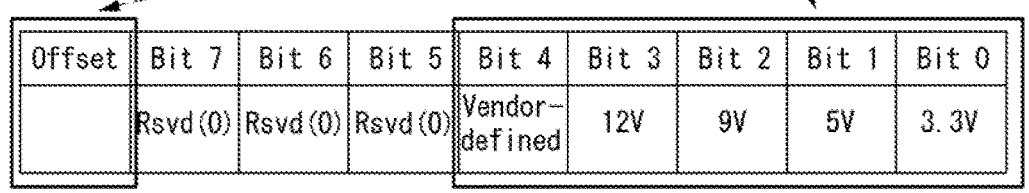
(b) Power delivery configuration register
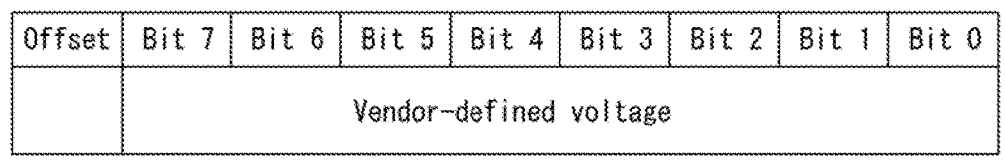
(c) Vendor-defined voltage register

[Fig. 12]
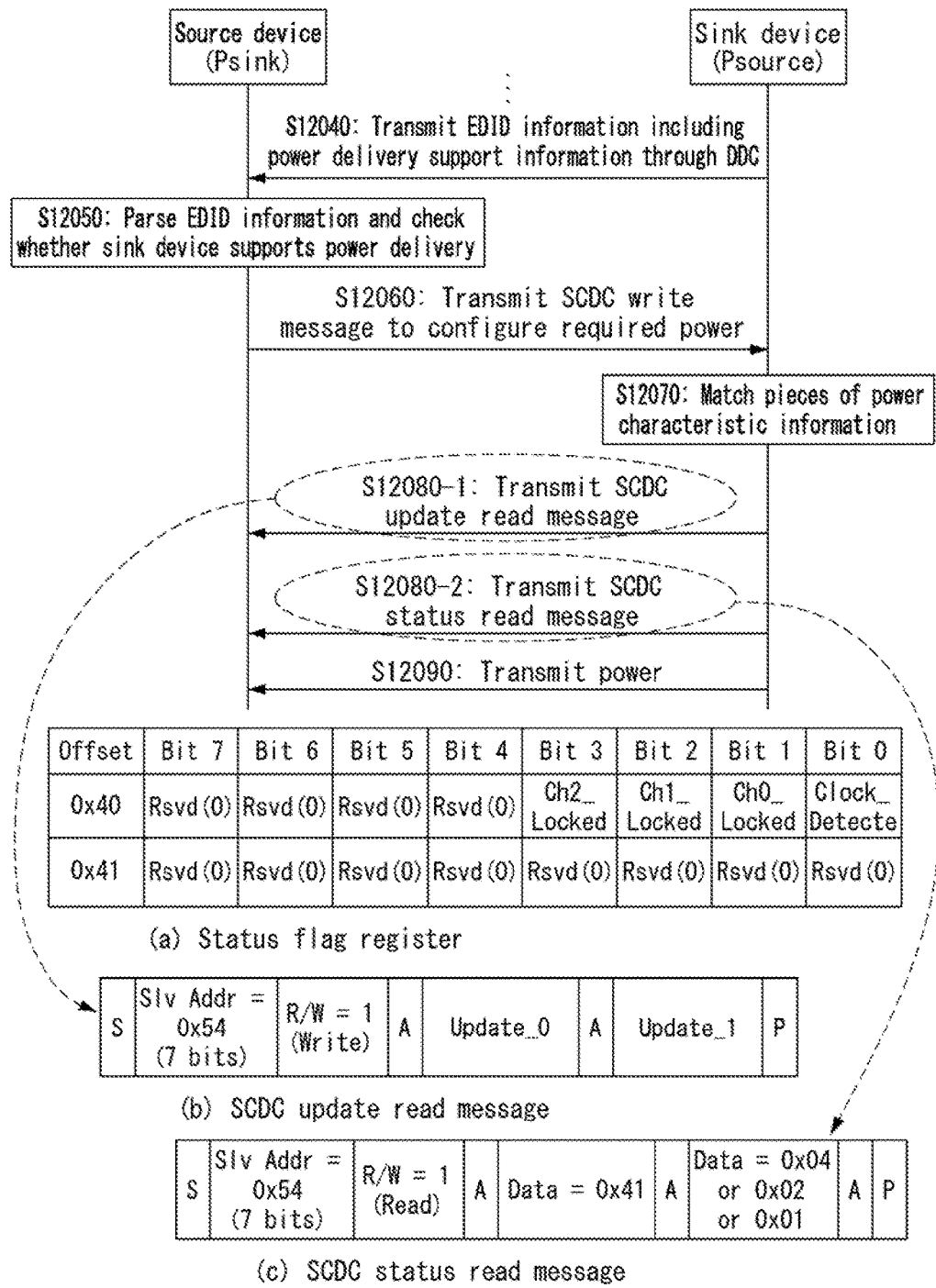

[Fig. 13]
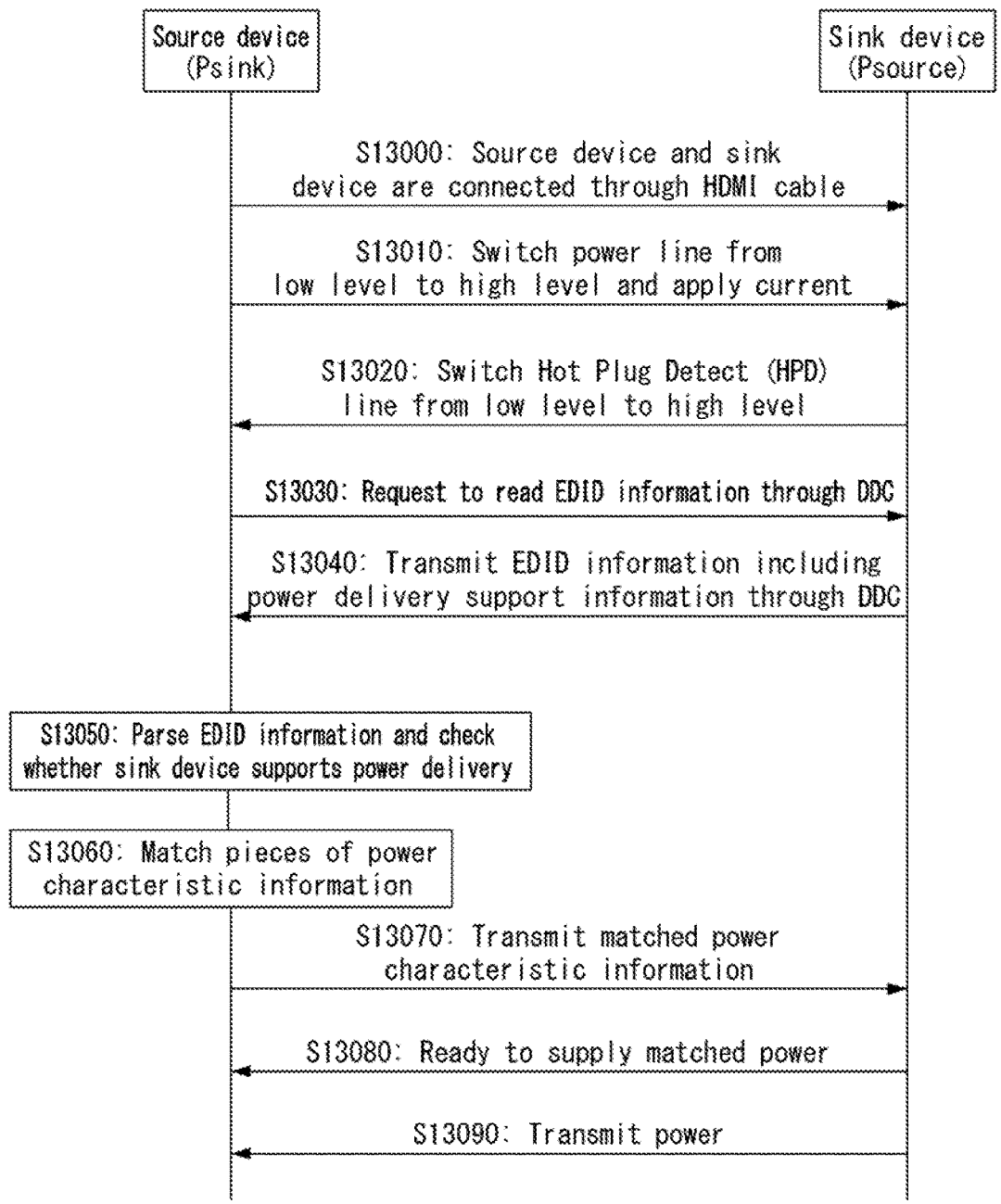

[Fig. 14]
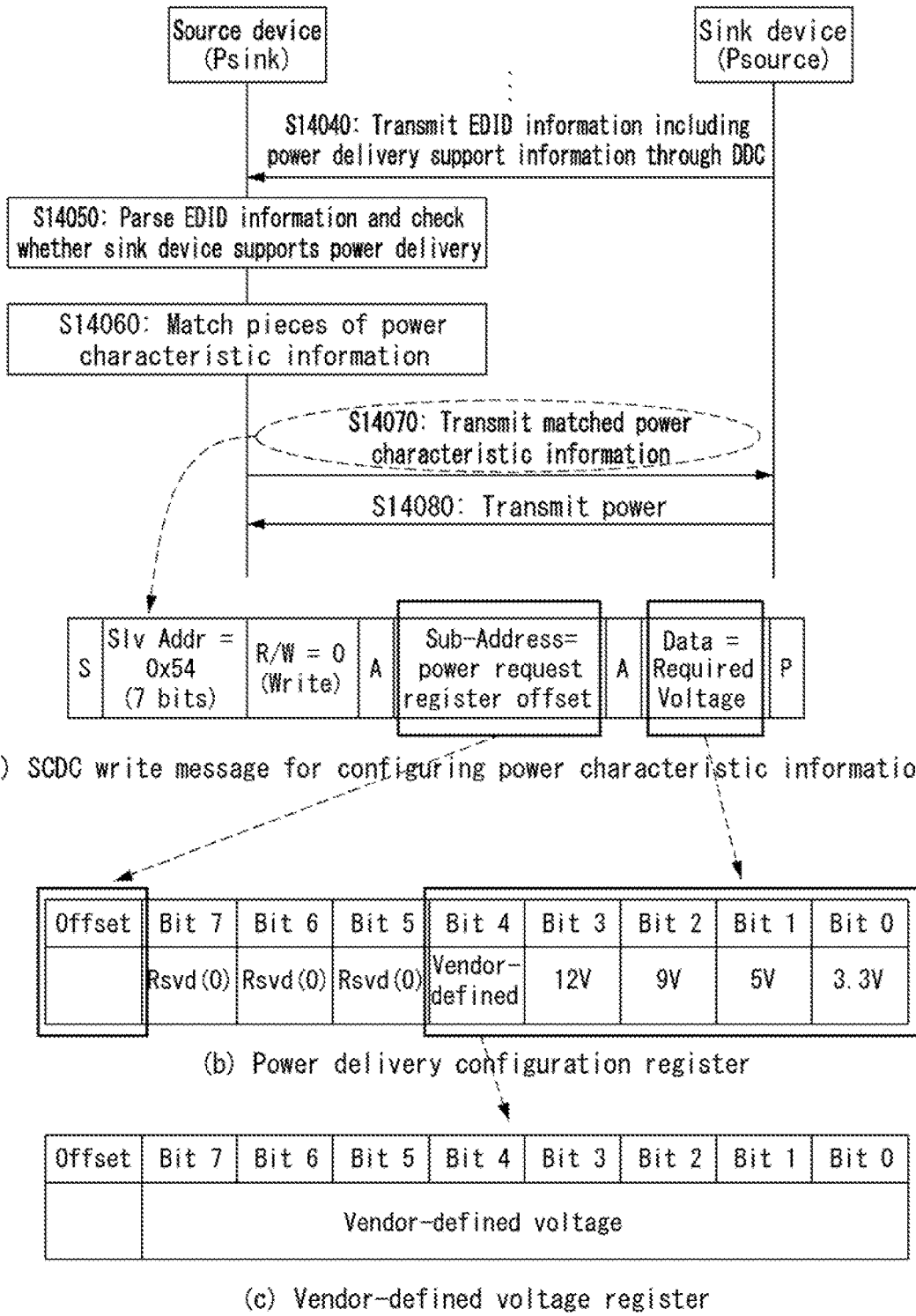

[Fig. 15]
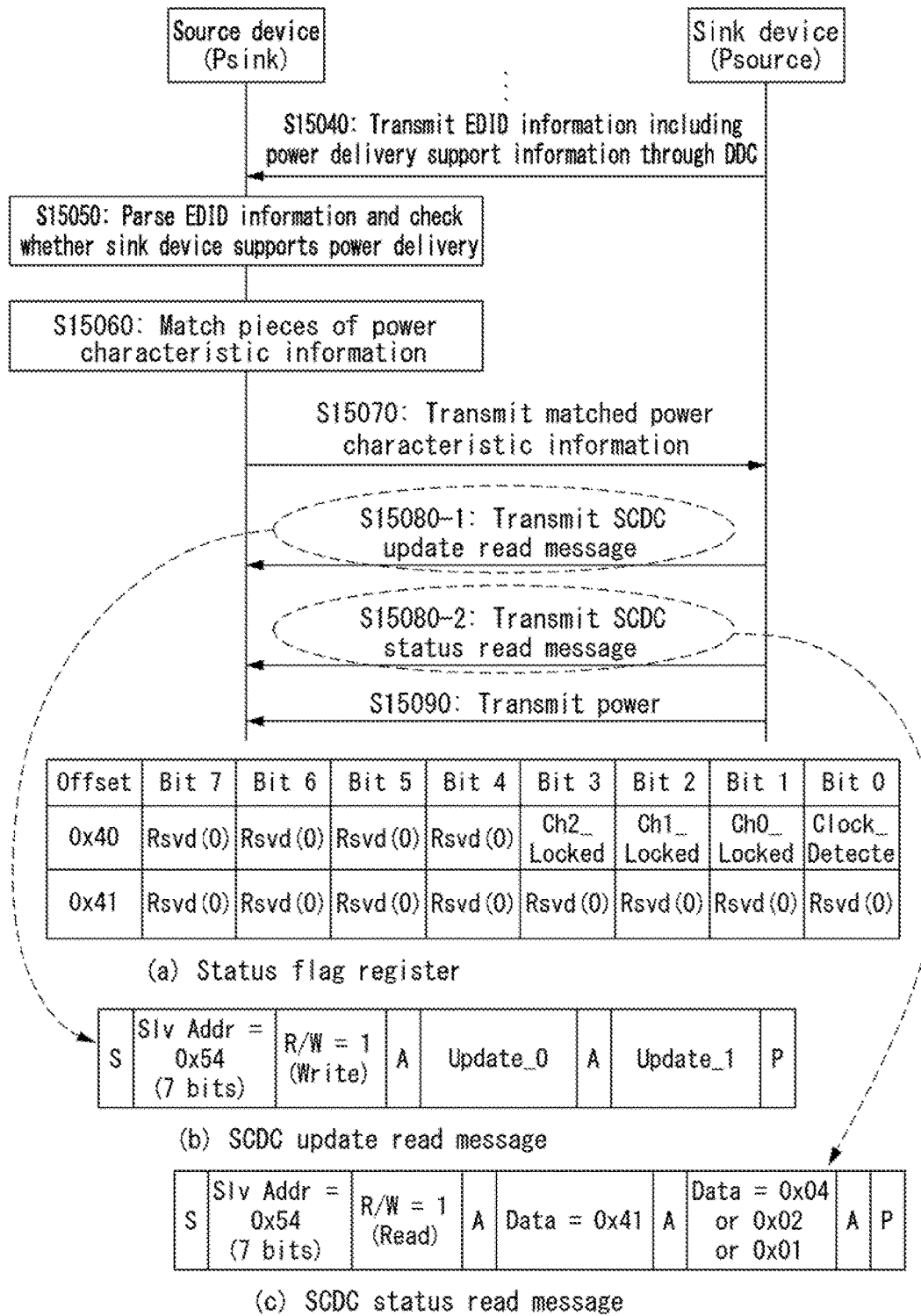

[Fig. 16]
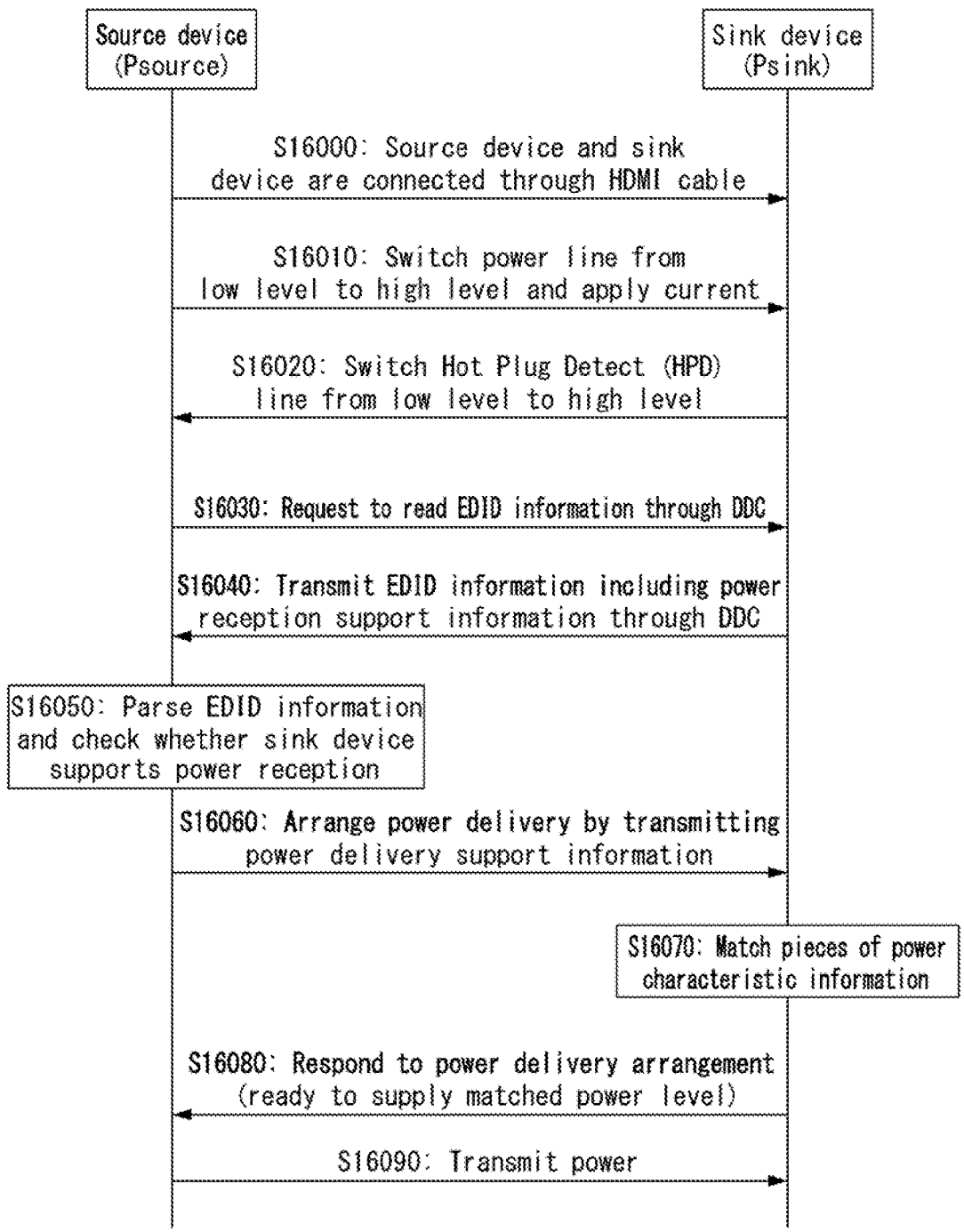

[Fig. 17]
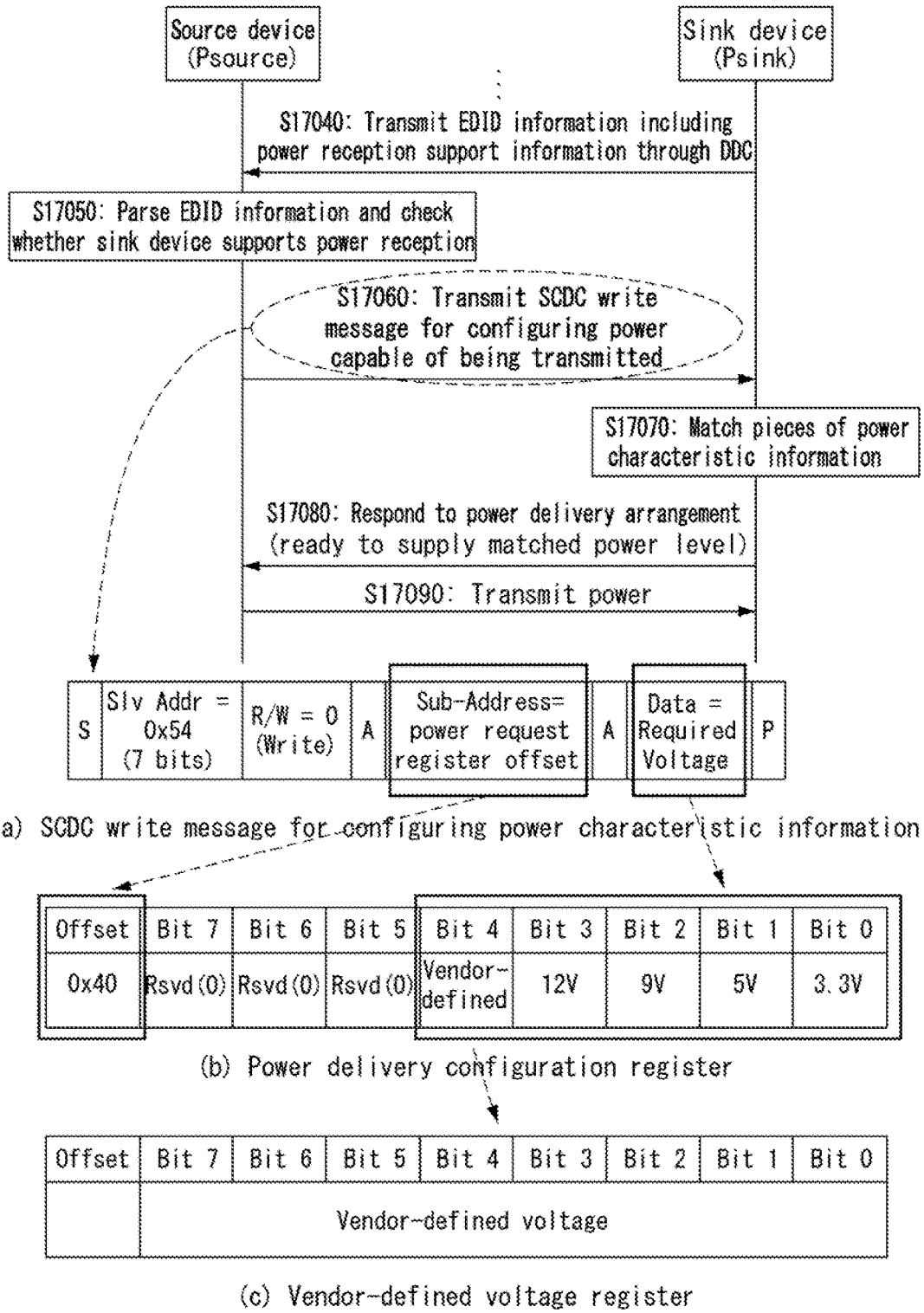

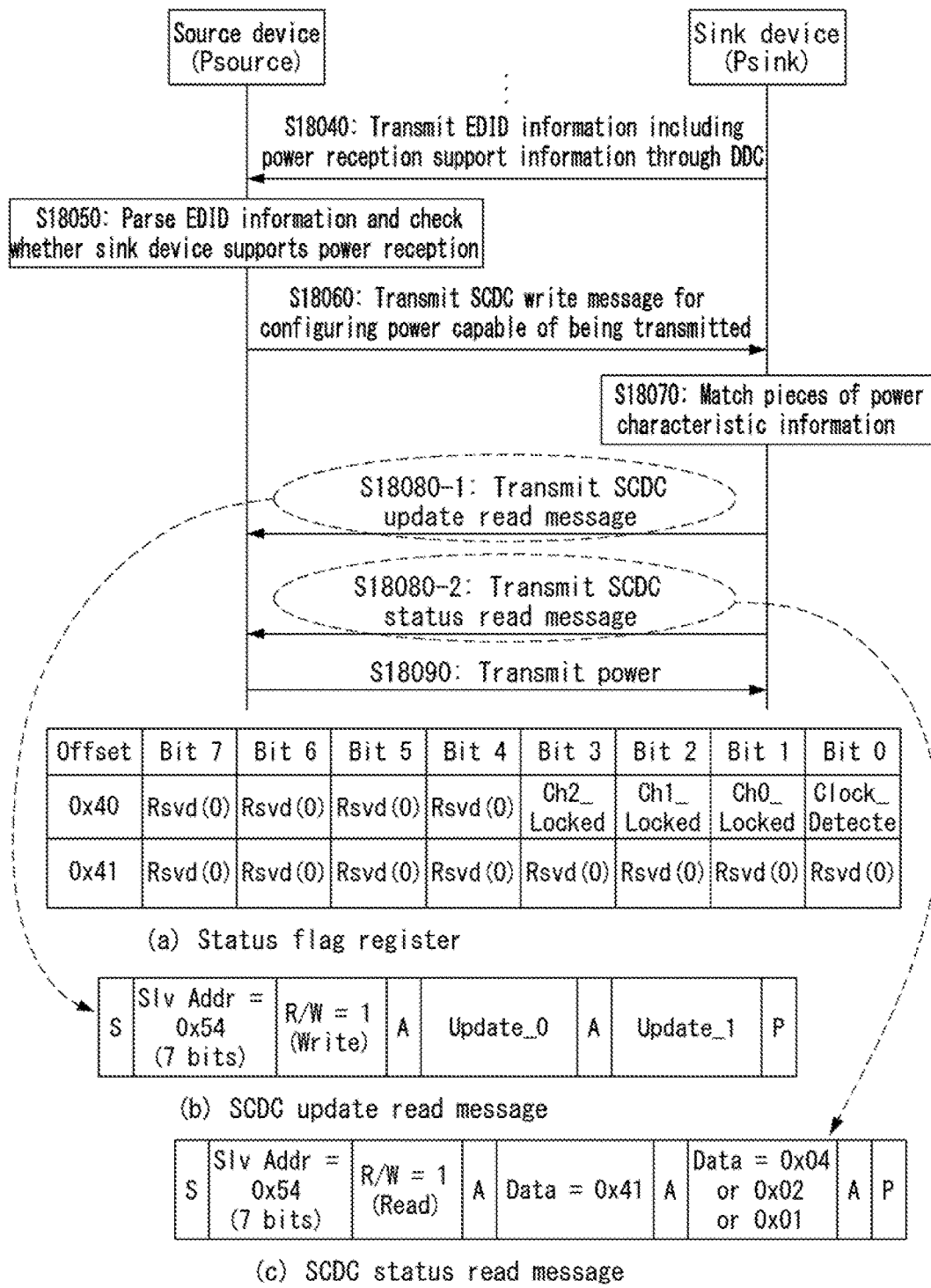
[Fig. 18]

[Fig. 19]
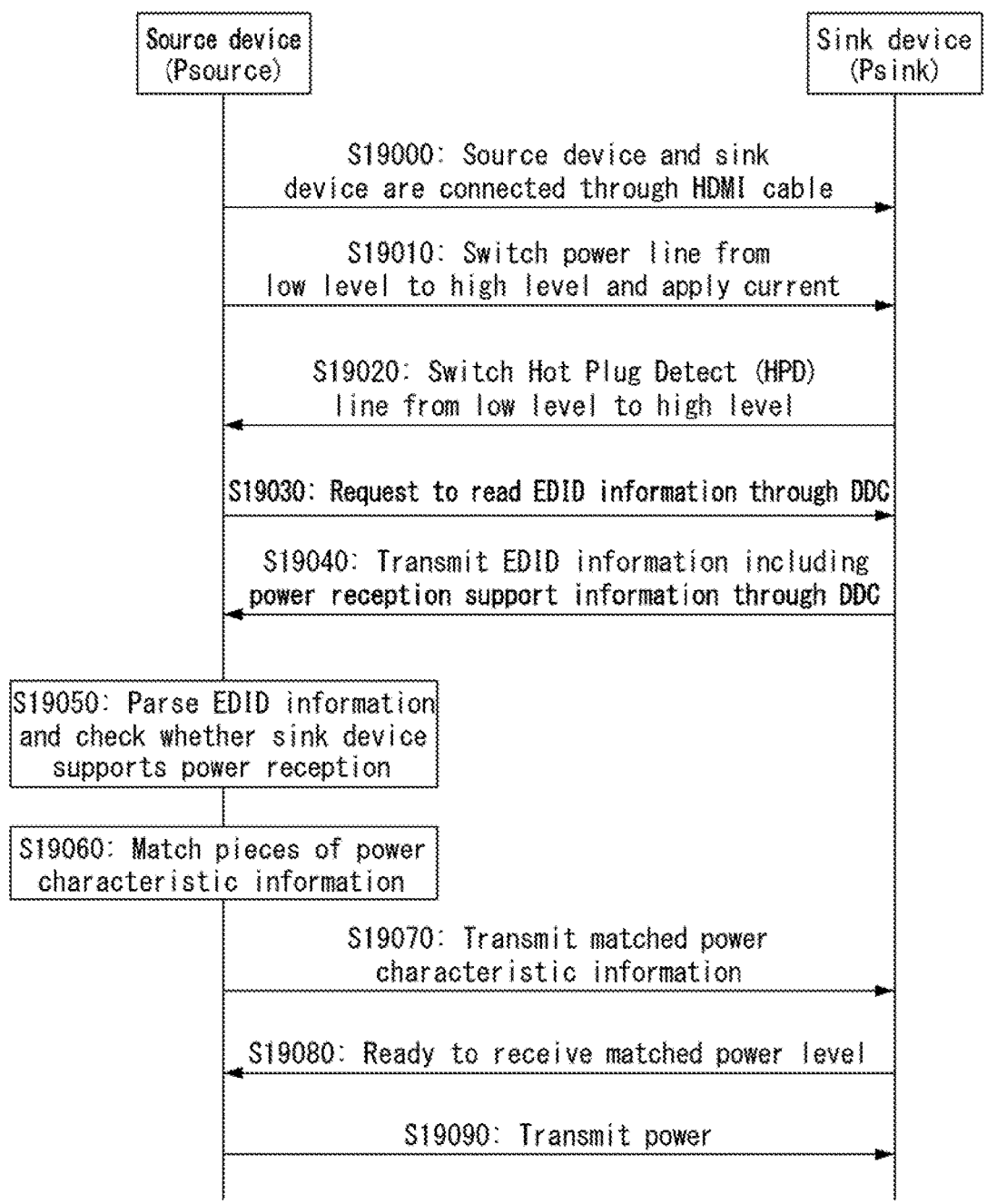

[Fig. 20]
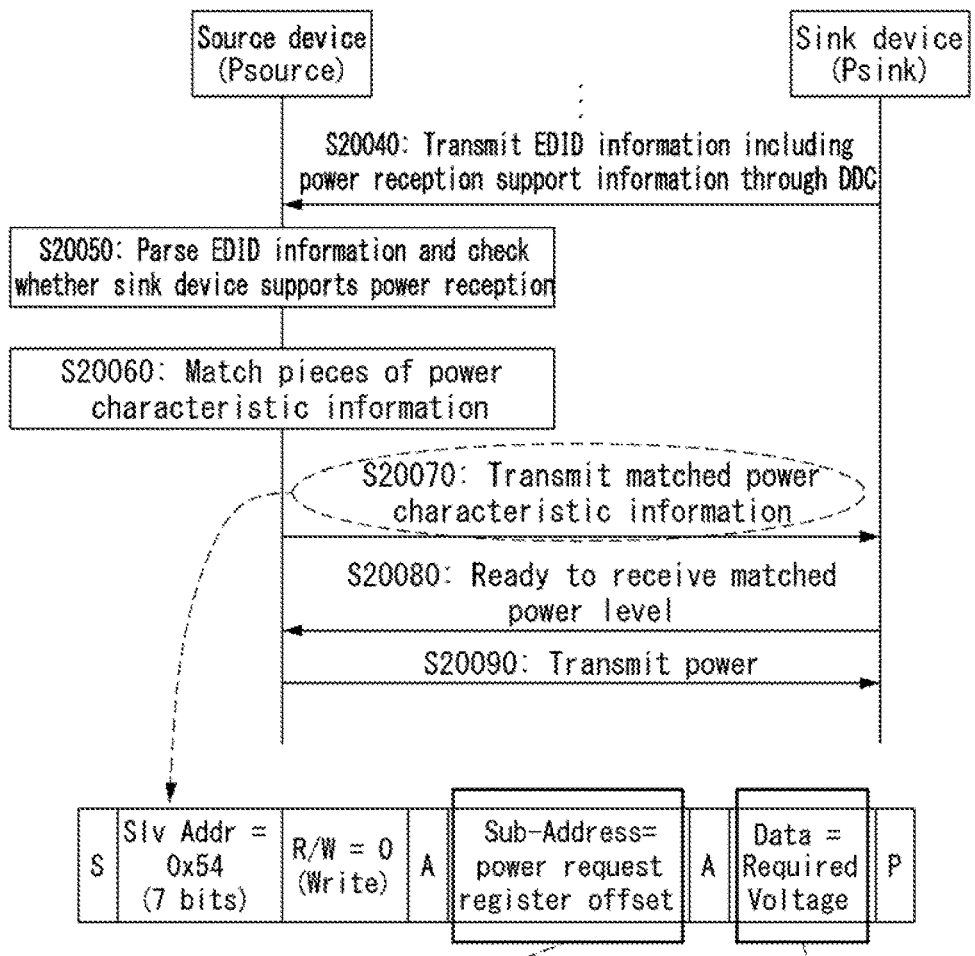
(a) SCDC write message for configuring power characteristic information
(b) Power delivery configuration register
(c) Vendor-defined voltage register

[Fig. 21]
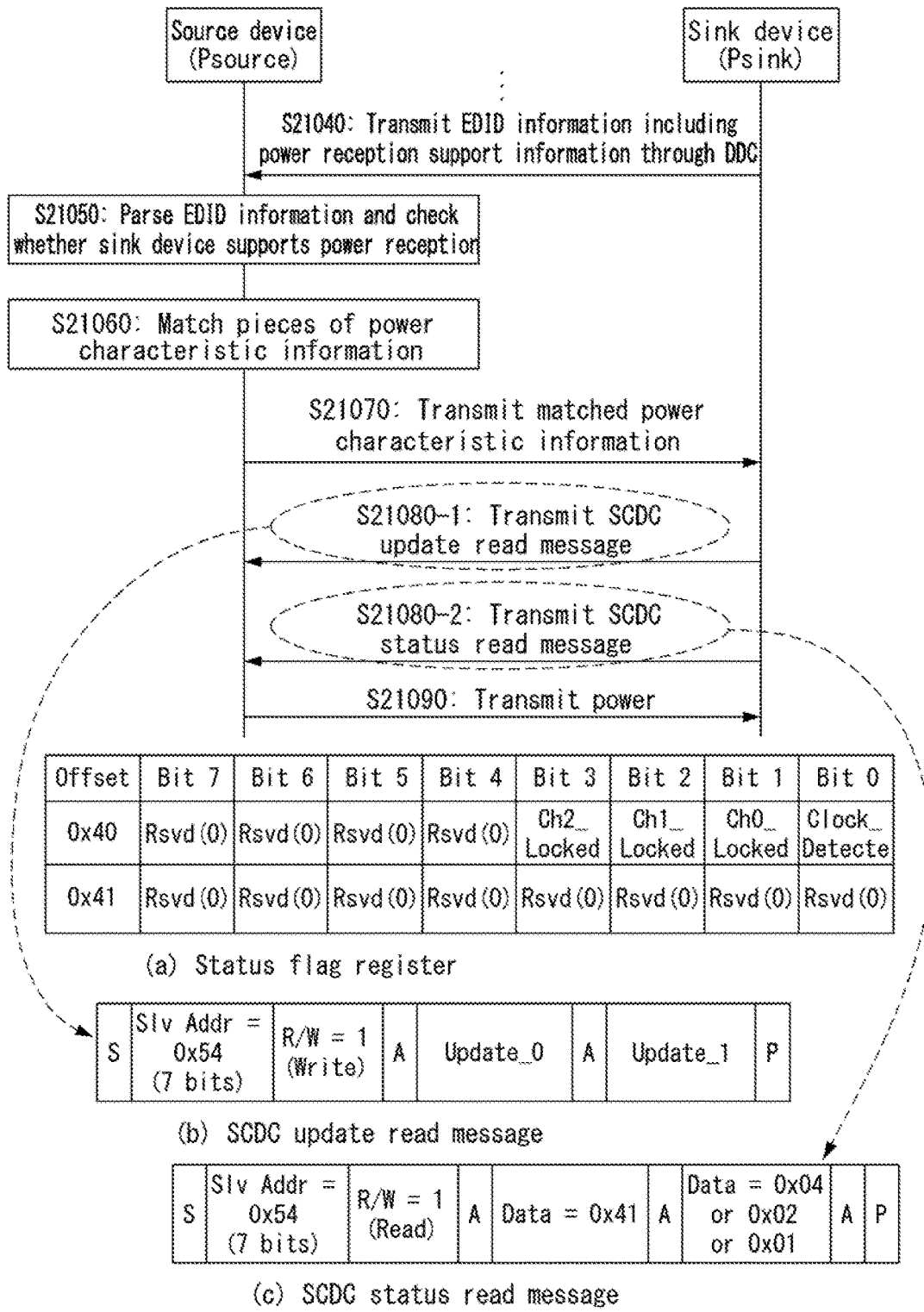

[Fig. 22]
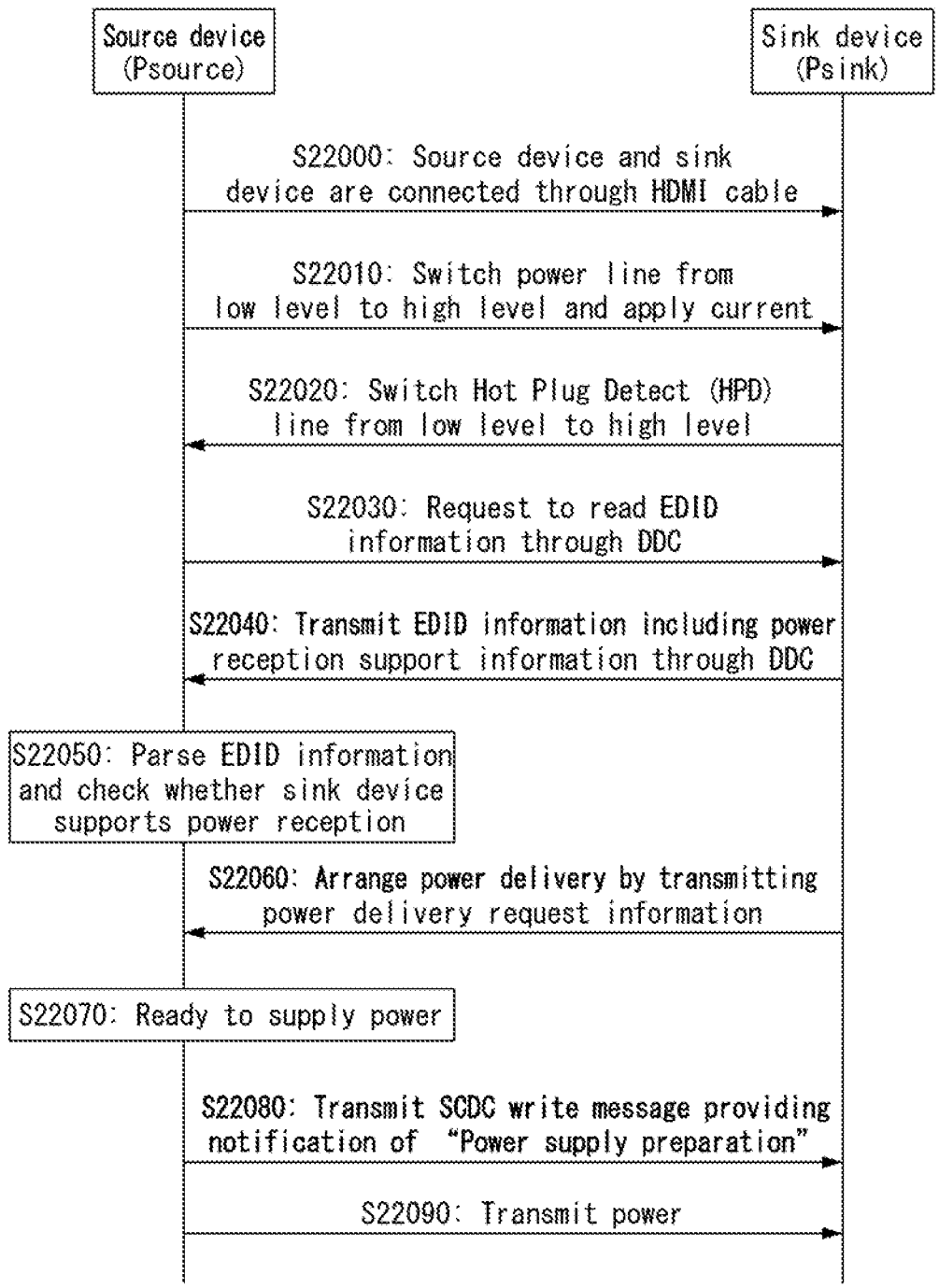

[Fig. 23]
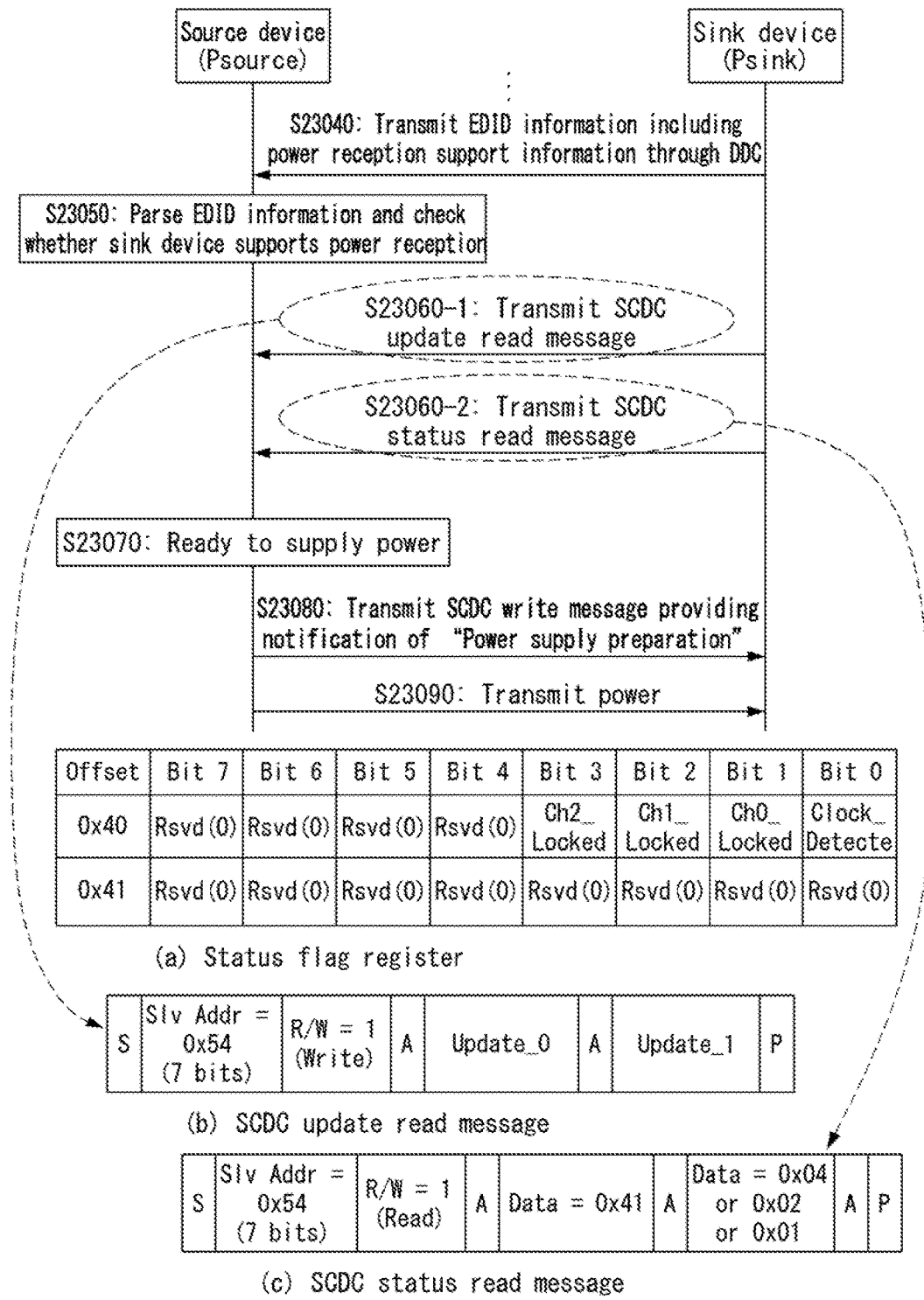

METHOD FOR TRANSMITTING AND RECEIVING POWER USING HDMI AND APPARATUS THEREFOR

CROSS REFERENCE TO RELATED APPLICATIONS

This application is the National Phase of PCT International Application No. PCT/KR2016/005931, filed on Jun. 3, 2016, which claims priority under 35 U.S.C. 119(e) to U.S. Provisional Application No. 62/170,707, filed on Jun. 4, 2015, all of which are hereby expressly incorporated by reference into the present application.

TECHNICAL FIELD

The present invention relates to a device and method for transmitting and receiving power using a High Definition Multimedia Interface (HDMI) and, more particularly, to a method of transmitting, by a PSource device, power to a PSink device using an HDMI and a device using the method.

BACKGROUND ART

An HDMI is an interface/standard that develops a Digital Visual Interface (DVI) which is an interface standard of personal computers and displays for a use of AV electronic products. Since the HDMI transmits video/audio from a player to a display device without compressing it, there is very little latency between a source device and a sink device. And the HDMI has high format compatibility since the HDMI does not require separate decoder chip or software. In addition, the HDMI is available to make wirings between AV devices be simplified, which were complicated because video signals, audio signals and control signals are transmitted on only one cable, and the HDMI provides a High-bandwidth Digital Content Protection (HDCP) technique, thereby providing the copyright protection function.

DISCLOSURE

Technical Problem

Today, a high-speed wired interface, such as the HDMI, is chiefly used to transmit a non-compression image. Furthermore, high-speed wired interfaces, such as HDMI and Displayport, are increasingly used due to the spread of portable devices, such as a low power smart phone, a tablet, and an ultra notebook, and in order to view an image of high picture quality, played back in devices (e.g., TV and a projector), on an external large screen.

If a portable device is driven for a long time, however, an external power source needs to continue to be supplied for optimum driving. To this end, an external power cable has to be connected to the portable device. However, since a wired interface does not support a power transfer function, a user feels inconvenient because he or she has to use an external power source and the wired interface in a device used for a connection with a power cable using a separate device. Accordingly, there is a need for a method of supplying the supply of a power source using a wired interface without an external separate device.

Technical Solution

In an embodiment of the present invention, a method for supplying and receiving, by a sink device, power using a High Definition Multimedia Interface (HDMI) may include being connected to a source device through the HDMI, receiving a +5 V signal, transmitting a Hot Plug Detect (HPD) signal, transmitting Extended Display Identification Data (EDID) information including power delivery support information or power delivery request information of the sink device, receiving a first Status and Control Data Channel (SCDC) write message including required power characteristic information indicative of a first power level requested by the source device from the sink device, writing the required power characteristic information in the power delivery configuration registers of a Status and Control Data Channel Structure (SCDCS), writing support power characteristic information indicative of a second power level capable of being supplied by the sink device in the status flag register of the SCDCS, transmitting the written support power characteristic information to the source device, and transmitting the power of the second power level to the source device.

Furthermore, the power delivery support information may include support power characteristic information indicative of a power level supported by the sink device for the source device. The power delivery request information may include required power characteristic information indicative of a power level requested by the sink device from the source device.

Furthermore, the power delivery support information or the power delivery request information may be transmitted in an HDMI Forum-Vendor Specific Data Block (HF-VSDB) form.

Furthermore, the first power level and the second power level may have the same level.

Furthermore, writing the support power characteristic information in the status flag register may include writing the support power characteristic information indicative of the second power level identical with the first power level if the sink device is capable of transmitting the first power level.

The method may further include receiving a second SCDC write message including support power characteristic information indicative of a third power level capable of being supplied to the sink device by the source device, writing the support power characteristic information in the power delivery configuration registers of the SCDCS, and receiving power of the third power level from the source device.

The method may further include writing reception power characteristic information indicative of a fourth power level consumed by the sink device in the status flag register of the SCDCS.

Furthermore, in an embodiment of the present invention, a method for receiving and supplying, by a source device, power using a High Definition Multimedia Interface (HDMI) may include being connected to a sink device through the HDMI, transmitting a +5 V signal, receiving a Hot Plug Detect (HPD) signal, receiving Extended Display Identification Data (EDID) information including power delivery support information or power delivery request information of the sink device, transmitting a first Status and Control Data Channel (SCDC) write message including required power characteristic information indicative of a first power level requested by the source device from the sink device, receiving support power characteristic information indicative of a second power level capable of being supplied by the sink device, and receiving the power of the second power level from the source device.

Furthermore, the power delivery support information may include support power characteristic information indicative of a power level supported by the sink device for the source device. The power delivery request information may include required power characteristic information indicative of a power level requested by the sink device from the source device.

Furthermore, the power delivery support information or the power delivery request information may be received in an HDMI Forum-Vendor Specific Data Block (HF-VSDB) form.

The method may further include comparing the first power level with the second power level in order to check whether the first power level and the second power level are matched.

Furthermore, the first power level and the second power level may have the same level.

The method may further include transmitting a second SCDC write message including support power characteristic information indicative of a third power level capable of being supplied to the sink device by the source device and transmitting power of the third power level to the sink device.

The method may further include writing reception power characteristic information indicative of a fourth power level consumed by the sink device in the status flag register of the SCDCS.

Advantageous Effects

In accordance with an embodiment of the present invention, a source device can supply a power source without a separate cable connection because power can be transmitted and received between the source device and a sink device through the HDMI.

Furthermore, in accordance with an embodiment of the present invention, a source device can receive power depending on the type of sink device because it can be aware of whether a sink device has the ability to supply power through EDID information.

Furthermore, in accordance with an embodiment of the present invention, a PSource device can supply power of a proper level to a PSink device because the PSink device transmits its supported power information.

Furthermore, in accordance with an embodiment of the present invention, a PSource device or a PSink device can supply/receive power of an optimum level because it matches its power information with that of a counterpart device.

Furthermore, in accordance with an embodiment of the present invention, if a PSink device requires that power be supplied thereto, it can directly request the supply of power from a PSource device through an SCDCS. Accordingly, inconvenience on the user side can be solved because a PSink device can required power from a PSource device, if necessary, although a user does not set the supply of power separately.

Furthermore, in accordance with an embodiment of the present invention, a source device or a sink device can detect whether the battery capacity of a counterpart device is low or high and transmit power to the counterpart device using a signal in an existing HDMI connection step.

Furthermore, in accordance with an embodiment of the present invention, there is an advantage in that the present invention can be flexibly applied to an HDMI system in which the supply current of a PSource is determined to be a predetermined level because power characteristic information is written in specific registers of an SCDCS in n a watt unit.

Furthermore, in accordance with an embodiment of the present invention, there is an advantage in that power can be transmitted/received more efficiently and stably because a sink device writes information about a power level, directly received or supplied by the sink device, in an SCDCS explicitly and thus a power level can be negotiated between the sink device and a source device in real time.

Other advantageous effects of the present invention are described later in Best Mode for Invention.

DESCRIPTION OF DRAWINGS

FIG. 1 is a block diagram showing an HDMI system according to an embodiment of the present invention.

FIG. 2 is a flowchart illustrating a power transmission/reception operation of the HDMI system according to a first embodiment of the present invention.

FIG. 3 is a flowchart illustrating a power transmission/reception operation of the HDMI system according to a second embodiment of the present invention.

FIG. 4 is a flowchart illustrating a power transmission/reception operation of the HDMI system according to a third embodiment of the present invention.

FIG. 5 is a flowchart illustrating a power transmission/reception operation of the HDMI system according to a fourth embodiment of the present invention.

FIG. 6 is a flowchart illustrating a power transmission/reception operation of the HDMI system according to a fifth embodiment of the present invention.

FIG. 7 is a flowchart illustrating a power transmission/reception operation of the HDMI system according to a sixth embodiment of the present invention.

FIG. 8 is a flowchart regarding the HDMI system in which power is supplied to a source device, that is, a low/dead battery, according to an embodiment of the present invention.

FIG. 9 is a flowchart regarding the HDMI system in which power is supplied to a sink device, that is, a low/dead battery, according to an embodiment of the present invention.

FIG. 10 is a flowchart illustrating a method for transmitting and receiving power through an HDMI according to a first embodiment of the present invention.

FIG. 11 is a flowchart illustrating the method for transmitting and receiving power through an HDMI according to the first embodiment of the present invention, and shows a method for transmitting and receiving power using an SCDC (or SCDCS).

FIG. 12 is a flowchart illustrating the method for transmitting and receiving power through an HDMI according to the first embodiment of the present invention, and shows a method for transmitting and receiving power using an SCDC.

FIG. 13 is a flowchart illustrating a method for transmitting and receiving power through an HDMI according to a second embodiment of the present invention.

FIG. 14 is a flowchart illustrating the method for transmitting and receiving power through an HDMI according to the second embodiment of the present invention, and shows a method for transmitting and receiving power using an SCDC (or SCDCS).

FIG. 15 is a flowchart illustrating the method for transmitting and receiving power through an HDMI according to the second embodiment of the present invention, and shows a method for transmitting and receiving power using an SCDC.

FIG. 16 is a flowchart illustrating a method for transmitting and receiving power through an HDMI according to a third embodiment of the present invention.

FIG. 17 is a flowchart illustrating the method for transmitting and receiving power through an HDMI according to the third embodiment of the present invention, and shows a method for transmitting and receiving power using an SCDC (or SCDCS).

FIG. 18 is a flowchart illustrating the method for transmitting and receiving power through an HDMI according to the third embodiment of the present invention, and shows a method for transmitting and receiving power using an SCDC.

FIG. 19 is a flowchart illustrating a method for transmitting and receiving power through an HDMI according to a fourth embodiment of the present invention.

FIG. 20 is a flowchart illustrating the method for transmitting and receiving power through an HDMI according to the fourth embodiment of the present invention, and shows a method for transmitting and receiving power using an SCDC (or SCDCS).

FIG. 21 is a flowchart illustrating the method for transmitting and receiving power through an HDMI according to the fourth embodiment of the present invention, and shows a method for transmitting and receiving power using an SCDC.

FIG. 22 is a flowchart illustrating a method for transmitting and receiving power through an HDMI according to a fifth embodiment of the present invention.

FIG. 23 is a flowchart illustrating the method for transmitting and receiving power through an HDMI according to the fifth embodiment of the present invention, and shows a method for transmitting and receiving power using an SCDC.

BEST MODE FOR INVENTION

Terms used in the present invention are common terms now widely used by taking into consideration functions in the present invention, but the terms may be changed depending on intentions or use practices of those skilled in the art or the appearance of a new technology. Furthermore, in a specific case, some terms are randomly selected by the applicant. In this case, the detailed meaning of a corresponding term will be described in the corresponding part of the description of the present invention. Accordingly, the terms used in the present invention should not be understood simply based on their names, but should be understood based on their substantial meanings and contents over this specification.

Furthermore, although embodiments are described in detail with reference to the accompanying drawings and contents described in the drawings, the present invention is not restricted by or limited to the embodiments.

Some embodiments of the present invention are described in more detail below with reference to the accompanying drawings.

FIG. 1 is a block diagram showing an HDMI system according to an embodiment of the present invention. Hereinafter, devices that transmit and receive video/audio/control data using the HDMI are collectively called an HDMI system.

Referring to FIG. 1, the HDMI system may include a source device 100 and a sink device 200. In particular, in an HDMI system, a device that transmits video/audio data through the HDMI may correspond to the source device 100, and a device that receives video/audio data through the HDMI may correspond to the sink device 200. In this case, an HDMI cable and connectors may be provided as a physical device that supports the transmission and reception of data by connecting the two devices.

The HDMI cables and the connectors may perform the pairing of four channels that provides a Transition Minimized Differential Signaling (TMDS) data channel and a TMDS clock channel. The TMDS data channels may be used to forward video data, audio data and auxiliary data.

Additionally, the HDMI system provides a Video Electronics Standards Association (VESA) Display Data Channel (DDD). The DDC is used for the configuration of a source device and a sink device and the exchange of status information between them. A CEC protocol can provide a high-level control function among various audio-visual products in a user environment and may be used optionally. Also, an optional HDMI Ethernet and Audio Return Channel (HEAC) may provide Ethernet-compatible data networking among an Audio Return Channel (ARC) and connected devices in the opposite direction from a TMDS.

Video data, audio data and supplementary data may be transmitted and received through three TDMS data channels. Commonly, a TMDS clock runs a video pixel rate, and is transmitted through a TMDS clock channel. The TMDS clock may be used as a reference frequency for data recovery in three TMDS data channels in an HDMI receiver. In a source device, the data of 8 bits per TMDS data channel may be transformed into a sequence of 10 bits of which transition is minimized, which is DC balanced, and transmitted in a serial manner at the rate of 10 bits per TMDS clock period.

In order to transmit audio data and supplementary data through the TMDS channel, the HDMI uses a packet structure. In order to attain high reliability for audio data and control data, data may be transmitted in word of 10 bits which is generated by using a BCH error correction code and an error reduction coding.

The source device can figure out configuration information and available functions of the sink device by reading out Enhanced Extended Display Identification Data (E-EDID) of the sink device in the Display Data Channel (DDC). In what follows, the E-EDID may be called EDID information.

A utility line can be used for an optional extension function such as HEAC.

The source device 100 may receive Extended Display Identification Data (EDID) information from the sink device 200 through the DDC channel. The source device 100 may recognize the configuration information and support function of the sink device 200 by parsing the received EDID information. The EDID information may include at least one block including a variety of pieces of information about the sink device 200.

In particular, the EDID information according to an embodiment of the present invention may include information about the function and power supply ability of the sink device 200 in the transmission and reception of power. The source device 100 may recognize the power transmission/reception ability of the sink device 200 through such EDID information, and thus may transmit power to the sink device 200 or receive power from the sink device 200.

The source device 100 includes at least one of a display unit 110, a user input interface unit 120, a control unit 180, a transmitter Tx, a memory unit 140, a storage unit 150, a multimedia unit 160, a power control unit 130, and a power supply unit 170.

The sink device 200 includes at least one of EDID EEPROM 210, a power control unit 220, a display unit 230, a user input interface unit 240, a receiver Rx, a control unit 280, a power supply unit 250, a memory unit 260, and a multimedia unit 270. A unit that performs the same operation is not redundantly described.

The source device 100 is indicative of a physical device that transmits or streams content, stored in the storage unit 150, to the sink device 200. The source device 100 may transmit a request message to the sink device 200 or may receive and process a request message received from the sink device 200. The source device 100 may provide a User Interface (UI) through which a response message transmitted by the sink device 200 in response to a received request message is processed and delivered to a user. If the source device 100 includes the display unit 110, it may provide the UI in the form of a display. Furthermore, the source device 100 may require the supply of power from the sink device 200.

The sink device 200 may receive content from the source device 100, may transmit a request message to the source device 100 or process a message received from the source device 100, and may transmit a response message. The sink device 200 may provide a UI through which a response message received from the source device 100 is processed and delivered to a user. If the sink device 200 includes the display unit 230, it may provide the UI in the form of a display. Furthermore, the sink device 200 may supply the source device 100 with power requested by the source device 100.

The user input interface unit 120, 240 may receive a user's action or input. In an embodiment, the user input interface 120, 240 may correspond to a remote controller, a voice reception/recognition device or a touch input sensing/reception device.

The control unit 180, 280 may control an overall operation of each device. In particular, the control unit 180, 280 may perform communication between the units of each device and control the operation of each unit.

The memory unit 140, 260 is indicative of a volatile physical device in which various types of data are temporarily stored.

The storage unit 150 is indicative of a non-volatile physical device capable of storing various types of data.

The EDID EEPROM 210 is indicative of EEPROM in which EDID information is stored.

All of the memory unit 140, 260, the storage unit 150, and the EDID EEPROM 210 function to store data, and they may be collectively called a memory unit.

The display unit 110, 230 may display data or content received through the HDMI, data and a UI stored in the memory unit, etc. under the control of the control unit 180, 280.

The multimedia unit 160, 270 may play back various types of multimedia. The multimedia unit 160, 270 may be implemented independently of the control unit 180, 280 or may be implemented as a single physical element along with the control unit 180, 280.

The power supply unit 170, 250 may supply power for the operations of the source device 100, the sink device 200, and the units of the source device 100 and the sink device 200.

The transmitter Tx is a unit included in the source device 100 and configured to transmit and receive data through the HDMI. The transmitter Tx performs the transmission and reception of data including messages, such as commands, requests and responses between the devices, in addition to audio/video data.

The receiver Rx is a unit included in the sink device 200 and configured to transmit and receive data through the HDMI. The receiver Rx performs the transmission and reception of data including messages, such as commands, requests or responses between the devices, in addition to audio/video data.

The power control unit 130, 220 may manage and control the transmission and reception of power between the devices through the transmitter and the receiver.

Units of the aforementioned units other than the transmitter Rx, the receiver Tx, and the control unit 180, 280 may be optionally included in the source device 100 or the sink device 200 according to an embodiment, and may not correspond to essential element units.

In a conventional technology, in an HDMI system, the transmission of power between a source device and a sink device is not supported. As a result, if a portable device is driven for a long time, a user feels inconvenient because he or she has to always connect an external power cable for optimum driving. In order to solve such inconvenience, this specification proposes a method for guaranteeing optimum driving of an HDMI system without an external separate device in such a manner that a wired interface supports a power transfer function in the HDMI system.

For convenience of a description hereunder, a device that supplies (or transmits) power is called a "PSource device", and a device that is supplied with (or receives) power is called a "PSink device." Furthermore, a device that simultaneously supports the functions of the PSource device and the PSink device is called a "dual device."

FIG. 2 is a flowchart illustrating a power transmission/reception operation of the HDMI system according to a first embodiment of the present invention. In this flowchart, a source device operates as a PSink device or a dual device, and a sink device operates as a PSource device.

Referring to FIG. 2, first, the sink device may transmit power supply support information to the source device (S2010).

More specifically, when the source device and the sink device are connected through an HDMI cable, the source device may receive EDID information from the sink device. In this case, the EDID information received by the source device may have included power supply support information about the sink device. The power supply support information may be included in the HDMI Forum-Vendor Specific Data Block (HF-VSDB) of the EDID information and transmitted and received. The power supply support information may include power-suppliable information indicating that the sink device can support a PSource function and/or supply power level information about a (maximum) power level that may be supplied to a PSink device as a PSource device. Accordingly, the source device may receive such EDID information and obtain a variety of pieces of information about the power supply ability of the sink device for the PSource device by parsing the received EDID information.

Next, the source device may transmit required power characteristic information to the sink device (S2020).

More specifically, the source device may transmit request information that requests the sink device to function as a PSource device and/or required power information about a (minimum) power level that needs to be supplied from the sink device, that is, the PSource device, to the sink device as the required power characteristic information. In this case, the request information and/or the required power characteristic information transmitted to the sink device may be transmitted in a Status and Control Data Channel (SCDC) parameter format, and may be written in (or set/updated) the request field "Power_Required_Source bit" and required power characteristic field "Power configuration register" of a Status and Control Data Channel Structure (SCDCS) stored in the sink device, respectively. The sink device may be aware of a power level required to be supplied to the source device along with the power supply request of the source device by reading an updated field.

Next, the sink device may be prepared to supply power to the source device (S2030). For example, the sink device may perform a circuit transition operation for physically supplying power of a level requested by the source device.

Next, the sink device may transmit a preparation completion message, providing notification that it has been ready to supply the power, to the source device (S2040). More specifically, the sink device that has been ready to supply the power of a level requested by the source device may write a preparation completion field "Power_Supply_Ready bit" within the SCDCS as a predetermined value indicative of the completion of the preparation of power supply (or the sink device functions as a PSource). The source device may be aware that the sink device has been ready to supply the power by reading an updated field from the sink device. In this case, the sink device may transmit power supply preparation completion information indicated by the preparation completion field to the source device as the preparation completion message.

Finally, the sink device may start the supply of power to the source device (S2050). More specifically, the sink device may transmit the power of a level requested by the source device to the source device through the HDMI cable.

Although not shown in this flowchart, the source device may additionally detect whether the power has been supplied (or provided) by the sink device and/or the level of supplied power if the power has been supplied (or provided) (i.e., whether the supply of power has failed or succeeded), and may notify the sink device of a result of the detection. More specifically, the source device may transmit supply status information indicating whether the supply of power from the sink device has succeeded or failed to the sink device as an SCDC parameter format. In this case, the transmitted information may be written in a supply status field "Power_Supply_Status bit" within the SCDCS of the sink device. The sink device may be aware of whether the transmission of the power is successful or not by reading a corresponding updated field.

After step S2040, the source device may wait for the predetermined time until it receives the power. For example, after receiving information indicating that the sink device has been ready to supply power from the sink device (S2040), the source device may wait for about 100 ms until it actually receives the power. If the power is not received for 100 ms, the source device may return to step S2020 in order to negotiate for the supply of power with the sink device or may transmit a message, providing notification of the stop of the power supply procedure, to the sink device.

FIG. 3 is a flowchart illustrating a power transmission/reception operation of the HDMI system according to a second embodiment of the present invention. In this flowchart, the source device operates as a PSink device, and the sink device operates as a dual device. If the sink device is a dual device, the default function of the sink device may be a PSource. The description given with reference to FIG. 2 may be identically applied to this flowchart.

Referring to FIG. 3, first, the sink device may transmit power supply support information to the source device (S3010).

More specifically, when the source device and the sink device are connected through an HDMI cable, the source device may receive EDID information from the sink device. In this case, the EDID information received by the source device may have included power supply support information about the sink device. The power supply support information may be included in an HF-VSDB within the EDID information and transmitted and received. The power supply support information may include power-suppliable/receivable information indicating that the sink device can support a dual function and supply power level information about a maximum power level which can be supplied to a PSink device as a PSource device.

Next, the source device may transmit required power characteristic information to the sink device (S3020).

More specifically, the source device may transmit request information that requests the sink device to function as a PSource device and/or required power information about a (minimum) power level that needs to be supplied from the sink device, that is, a dual device, to the sink device as the required power characteristic information. In this case, the request information and/or the required power characteristic information transmitted to the sink device may be transmitted in a Status and Control Data Channel (SCDC) parameter format, and may be written in (or set/updated) the request field "Power_Required_Source bit" and required power characteristic field "Power configuration register" of a Status and Control Data Channel Structure (SCDCS) stored in the sink device, respectively. The sink device may be aware of a power level required to be supplied to the source device along with the power supply request of the source device by reading an updated field.

Next, the sink device may be prepared to supply power to the source device (S3030). For example, the sink device may perform a circuit transition operation for physically supplying power of a level requested by the source device.

Next, the sink device may transmit a preparation completion message, providing notification that it has been ready to supply the power, to the source device (S3040). More specifically, the sink device that has been ready to supply the power of a level requested by the source device may write a preparation completion field "Power_Supply_Ready bit" within the SCDCS as a predetermined value indicative of the completion of the preparation of power supply (or the sink device functions as a PSource). The source device may be aware that the sink device has been ready to supply the power by reading an updated field from the sink device. In this case, the sink device may transmit power supply preparation completion information indicated by the preparation completion field to the source device as the preparation completion message.

Finally, the sink device may start the supply of power to the source device (S3050). More specifically, the sink device may transmit the power of a level requested by the source device to the source device through the HDMI cable.

Although not shown in this flowchart, as described above with reference to FIG. 2, the source device may additionally detect whether the power has been supplied (or provided) by the sink device and/or the level of supplied power (i.e., supply status information) if the power has been supplied (or provided), and may notify the sink device of a result of the detection. Furthermore, after step S3040, the source device may wait for a predetermined time until it is supplied with the power.

Referring to the first and the second embodiments, it may be seen that the functions of the source and sink devices are slightly different, but overall operations of the HDMI systems are the same. Accordingly, in accordance with power transmission protocol of the first and the second embodiments, there is an advantage in that the HDMI system is simplified because a different protocol does not need to be applied depending on the function of each device.

FIG. 4 is a flowchart illustrating a power transmission/reception operation of the HDMI system according to a third embodiment of the present invention. In this flowchart, the source device operates as a PSource device or a dual device, and the sink device operates as a PSink device. The description given above with reference to FIGS. 2 and 3 may be identically applied to this flowchart.

Referring to FIG. 4, first, the sink device may transmit required power characteristic information to the source device (S4010).

More specifically, when the source device and the sink device are connected through an HDMI cable, the source device may receive EDID information from the sink device. In this case, the EDID information received by the source device may have included the required power characteristic information of the sink device. The required power characteristic information may be included in an HF-VSDB within the EDID information and transmitted and received. The required power characteristic information may include power-receivable information indicating that the sink device can support a PSink function and reception power level information about a minimum power level that is to be supplied from a PSource device as a PSink device.

Next, the sink device may request the source device to supply power (S4020).

More specifically, if the supply of power is required, the sink device may write a request field "Power_Required_Sink bit" indicative of a request for the supply of power in a Status and Control Data Channel Structure (SCDCS) as a predetermined value that request the supply of power (or indicating that the sink device functions as a PSink). The source device may receive the power supply request of the sink device by reading a corresponding updated field within the SCDCS of the sink device.

Next, the source device may be prepared to supply power to the sink device (S4030). For example, the source device may perform a circuit transition operation for physically supplying power of a level requested by the sink device. At this time, the sink device may also be prepared to be stably supplied with the power from the source device. This operation may be optionally performed according to an embodiment.

Next, the source device may transmit a preparation completion message, providing notification that it has been ready to supply the power of a level requested by the sink device, to the sink device (S4040). For example, the source device may transmit the preparation completion message, providing notification that it has completed the preparation of the supply of power, to the sink device. The preparation completion message may be transmitted in a Status and Control Data Channel (SCDC) parameter format, and may be written (or set/updated) in the preparation completion field "Power_Supply_Ready bit" of the SCDCS stored in the sink device. The sink device may be aware that the source device has been ready to supply power by reading an updated field within the SCDCS.

Finally, the source device may start the supply of power to the sink device (S4050). More specifically, the source device may transmit the power of a level requested by the sink device to the source device through the HDMI cable.

Although not shown in this flowchart, the source device may compare a power level to be received by the sink device with a power level that may be supplied by the source device (prior to step S4040 or at step S4030). If the two power levels are matched (i.e., if the source device can supply the power of a level requested by the sink device), the source device may continue to perform the power negotiation with the sink device (e.g., the source device may enter step S4040). If the two power levels are not matched (i.e., if the two power levels are not the same), the source device may stop the power negotiation with the sink device. This operation may be optionally performed according to an embodiment, and order of the operation may be exchanged with that of another step.

Furthermore, as described above with reference to FIG. 2, in addition to this flowchart, the sink device may detect whether the power has been supplied by the source device and/or the level of supplied power (i.e., supply status information) if the power has been supplied, and may notify the source device of the detection. More specifically, the sink device may store information indicating whether the supply of power from the source device has succeeded or failed in the supply status field "Power_Supply_Status bit" of the SCDCS. The source device may be aware of whether the transmission of the power is successful or not by reading a corresponding updated field.

Furthermore, after step S4040, the sink device may wait for a predetermined time until it is supplied with the power.

FIG. 5 is a flowchart illustrating a power transmission/reception operation of the HDMI system according to a fourth embodiment of the present invention. In this flowchart, the source device operates as a PSource device, and the sink device operates as a dual device. The description given above with reference to FIGS. 2 to 4 may be identically applied to this flowchart.

Referring to FIG. 5, first, the sink device may transmit required power characteristic information to the source device (S5010).

More specifically, when the source device and the sink device are connected through an HDMI cable, the source device may receive EDID information from the sink device. In this case, the EDID information received by the source device may have included the required power characteristic information of the sink device. The required power characteristic information may be included in an HF-VSDB within the EDID information and transmitted and received. The required power characteristic information may include power-suppliable/receivable information indicating that the sink device can support a dual function and reception power level information about a minimum power level to be supplied from a PSource device as a PSink device.

Next, the sink device may request the source device to supply power (S5020).

More specifically, if the sink device requires that power be supplied thereto, it may write a request field "Power_Required_Sink bit" indicative of a request for the supply of power in a Status and Control Data Channel Structure (SCDCS) as a predetermined value that requests the supply of power (or indicating that the sink device functions as a PSink). The source device may receive the power supply request of the sink device by reading a corresponding updated field within the SCDCS of the sink device.

Next, the source device may be prepared to supply power to the sink device (S5030). For example, the source device may perform a circuit transition operation for physically supplying power of a level requested by the sink device. At this time, the sink device may also be prepared to be stably supplied with the power from the source device. This operation may be optionally performed according to an embodiment.

Next, the source device may transmit a preparation completion message, providing notification that it has been ready to supply the power of a level requested by the sink device, to the sink device (S5040). For example, the source device may transmit the preparation completion message, providing notification that the preparation of the supply of power has been completed, to the sink device. The preparation completion message may be transmitted in a Status and Control Data Channel (SCDC) parameter format, and may be written (or set/updated) in the preparation completion field "Power_Supply_Ready bit" of the SCDCS stored in the sink device. The sink device may be aware that the source device has been ready to supply power by reading an updated field within the SCDCS.

Finally, the source device may start the supply of power to the sink device (S5050). More specifically, the source device may transmit the power of a level requested by the sink device to the source device through the HDMI cable.

Although not shown in this flowchart, the source device may compare a power level to be received by the sink device with a power level that may be supplied by the source device (prior to step S5040 or at step S5030). If the two power levels are matched (i.e., if the source device can supply the power of a level requested by the sink device), the source device may continue to perform the power negotiation with the sink device (e.g., the source device may enter step S5040). If the two power levels are not matched (i.e., if the two power levels are not the same), the source device may stop the power negotiation with the sink device. This operation may be optionally performed according to an embodiment, and order of the operation may be exchanged with that of another step.

Furthermore, as described above with reference to FIG. 2, in addition to this flowchart, the sink device may detect whether the power has been supplied by the source device and/or the level of supplied power (i.e., supply status information) if the power has been supplied, and may notify the source device of the detection. More specifically, the sink device may store information indicating whether the supply of power from the source device has succeeded or failed in the supply status field "Power_Supply_Status bit" of the SCDCS. The source device may be aware of whether the transmission of the power is successful or not by reading a corresponding updated field.

Furthermore, after step S5040, the sink device may wait for a predetermined time until it receives the power.

Referring to the third and the fourth embodiments, it may be seen that the functions of the source and sink devices are slightly different, but overall operations of the HDMI systems are the same. Accordingly, in accordance with power transmission protocol of the third and the fourth embodiments, there is an advantage in that the HDMI system is simplified because a different protocol does not need to be applied depending on the function of each device FIG. 6 is a flowchart illustrating a power transmission/reception operation of the HDMI system according to a fifth embodiment of the present invention. In this flowchart, both the source device and the sink device operate as a dual device. If the sink device is a dual device, the default function of the sink device may be a PSource, and the default function of the source device may be a PSink. In this flowchart, a power transmission/reception operation if a connection with an external power adapter for supplying external power to the source device and the sink device has been released is described below. The description given above with reference to FIGS. 2 to 5 may be identically applied to this flowchart.

Referring to FIG. 6, first, the sink device may transmit power supply support information to the source device (S6010).

More specifically, when the source device and the sink device are connected through an HDMI cable, the source device may receive EDID information from the sink device. In this case, the EDID information received by the source device may have included power supply support information about the sink device. The power supply support information may be included in an HF-VSDB within the EDID information and transmitted and received. The power supply support information may include power-suppliable information indicating that the sink device can support a dual function and/or supply power level information about a (maximum) power level that may be supplied to a PSink device as a PSource device.

Next, the source device may transmit required power characteristic information to the sink device (S6020).

More specifically, the source device may transmit request information that requests the sink device to function as a PSource device and required power information about a (minimum) power level that needs to be supplied by the sink device, that is, a dual device, to the sink device as the required power characteristic information. In this case, the request information and/or the required power characteristic information transmitted to the sink device may be transmitted in a Status and Control Data Channel (SCDC) parameter format, and may be written (or set/updated) in the request field "Power_Required_Source bit" and required power characteristic field "Power configuration register" of a Status and Control Data Channel Structure (SCDCS) stored in the sink device. The sink device may be aware of a power level that needs to be received by the source device by reading an updated field.

Next, the sink device may be prepared to supply power to the source device (S6030). For example, the sink device may perform a circuit transition operation for physically supplying the power of a level requested by the source device. At this time, the source device may also be prepared to be stably supplied with the power from the sink device. This operation may be optionally performed according to an embodiment.

Next, the sink device may transmit a preparation completion message, providing notification that it has been ready to supply the power, to the source device (S6040). More specifically, the sink device that has been ready to supply the power of a level requested by the source device may write a preparation completion field "Power_Supply_Ready bit" within the SCDCS as a predetermined value indicative of the completion of the preparation of power supply (or the sink device functions as a PSource). The source device may be aware that the sink device has been ready to supply the power by reading an updated field. In this case, the sink device may transmit power supply preparation completion information indicated by the preparation completion field to the source device as the preparation completion message.

Finally, the sink device may start the supply of power to the source device (S6050). More specifically, the sink device may transmit the power of a level requested by the source device to the source device through the HDMI cable.

Although not shown in this flowchart, as described above with reference to FIG. 2, the source device may additionally detect whether the power has been supplied by the sink device and/or the level of supplied power if the power has been supplied (i.e., supply status information), and may notify the sink device of a result of the detection Furthermore, after step S6040, the source device may wait for a predetermined time until it receives the power.

FIG. 7 is a flowchart illustrating a power transmission/reception operation of the HDMI system according to a sixth embodiment of the present invention. In this flowchart, both the source device and the sink device operate as a dual device. If the sink device is a dual device, the default function of the sink device may be a PSource, and the default function of the source device may be a PSink. In this flowchart, a power transmission/reception operation if an external power adapter for supplying external power to the source device has been connected is described. Furthermore, this flowchart may be performed as a next operation of FIG. 6, and the description given above with reference to FIGS. 2 to 6 may be identically applied to this flowchart.

Referring to FIG. 7, first, the source device may request the sink device to stop the supply of power (S7010).

Next, the sink device may stop the supply of power to the source device (S7020). More specifically, the sink device may stop the supply of power to the source device in response to a request to stop the supply of power of the source device.

Next, the sink device may request the supply of power from the source device (S7030).

More specifically, if the sink device requires that power be supplied thereto, it may write a request field "Power_Required_Sink bit" indicative of a request for the supply of power in a Status and Control Data Channel Structure (SCDCS) in a predetermined value that requests the supply of power (or indicating that the sink device functions as a PSink). The source device may receive the power supply request of the sink device by reading a corresponding updated field within the SCDCS of the sink device.

Next, the source device may be prepared to supply power to the sink device (S7040). For example, the source device may perform a circuit transition operation for physically supplying power of a level requested by the sink device. At this time, the sink device may also be prepared to be stably supplied with the power from the source device. This operation may be optionally performed according to an embodiment.

Next, the source device may transmit a preparation completion message, providing notification that it has been ready to supply the power of a level requested by the sink device, to the sink device (S7050). For example, the source device may transmit the preparation completion message, providing notification that the preparation of the supply of power has been completed, to the sink device (S7050). The preparation completion message may be transmitted in a Status and Control Data Channel (SCDC) parameter format, and may be written (or set/updated) in the preparation completion field "Power_Supply_Ready bit" of the SCDCS stored in the sink device. The sink device may be aware that the source device has been ready to supply the power by reading an updated field within the SCDCS.

Finally, the source device may start the supply of power to the sink device (S7060). More specifically, the source device may transmit the power of a level requested by the sink device to the source device through an HDMI cable.

Although not shown in this flowchart, the source device may compare a power level to be received by the sink device with a power level that may be supplied by the source device (prior to step S7050 or at step S7040). If the two power levels are matched (i.e., if the source device can supply the power of a level requested by the sink device), the source device may continue to perform the power negotiation with the sink device (e.g., the source device may enter step S7050). If the two power levels are not matched (i.e., if the two power levels are not the same), the source device may stop the power negotiation with the sink device. This operation may be optionally performed according to an embodiment, and order of the operation may be exchanged with that of another step.

Furthermore, as described above with reference to FIG. 2, in addition to this flowchart, the sink device may detect whether the power has been supplied by the source device and/or the level of supplied power (i.e., supply status information) if the power has been supplied, and may notify the source device of the detection. More specifically, the sink device may store information indicating whether the supply of power from the source device has succeeded or failed in the supply status field "Power_Supply_Status bit" of the SCDCS. The source device may be aware of whether the transmission of the power is successful or not by reading a corresponding updated field.

Furthermore, after step S7050, the sink device may wait for a predetermined time until it receives the power.

It may be seen that the fifth and sixth embodiments are substantially the same as the third and fifth embodiments. Accordingly, in accordance with the power transmission protocol of the present invention, there is an advantage in that the HDMI system is simplified.

FIG. 8 is a flowchart regarding the HDMI system in which power is supplied to the source device, that is, a low/dead battery, according to an embodiment of the present invention. In this specification, the low/dead battery may mean that a power source is in a deactivated (or off) state because the amount of remaining battery power is less than a predetermined level has all be exhausted. In this flowchart, the source device operates as a PSink device, and the sink device operates as a PSource device. The description given above with reference to FIGS. 2 to 7 may be identically applied to this flowchart.

First, when the sink device is connected to the source device through an HDMI cable, it may check whether a +5 V signal is detected (S8010). When the source device having the amount of remaining battery power is connected to the sink device through the HDMI cable, it may transmit (or apply) a +5 V signal to the sink device by switching a +5 V power line from a low level to a high level and then applying a current. In contrast, the source device having the amount of remaining battery power of less than a predetermined level (i.e., the source device of a low/dead battery) cannot transmit a +5 V signal to the sink device because it cannot switch the +5 V power line from a low level to a high level. Accordingly, the sink device may determine whether the source device is in a low/dead battery state based on whether a +5 V signal is detected. In the present embodiment, the source device cannot transmit a +5 V signal to the sink device because it is in a low/dead battery state. As a result, the sink device cannot detect a +5 V signal.

Next, the sink device may supply power of a predetermined power level (or a default voltage and current) to the source device (S8020). In this case, the predetermined power level may be determined to be a minimum power level that is required to perform a power negotiation with the source device.

Next, the source device may transmit a +5 V signal to the sink device (S8030). The source device may become the state in which it can transmit the +5 V signal to the sink device because it has been supplied with power from the sink device at step S8020 and thus the power source of the source device has been activated (or on). As a result, the activated source device may transmit the +5 V signal to the sink device in order to receive EDID information from the sink device.

Next, the sink device may transmit a Hot Plug Detect (HPD) signal to the source device (S8040). More specifically, the sink device may switch the HPD line from a low level to a high level, and thus the HDMI cable is normally connected. Accordingly, the EDID-related circuit of the sink device is activated, and the sink device may notify the source device that the EDID information can be accessed.

Next, the source device and the sink device may perform the power negotiation according to the flowchart of FIGS. 2 and 3 and a power supply operation according to the results of the power negotiation. That is, the HDMI system may perform the operation of the flowchart of FIGS. 2 and 3 as the next operation of step S8040. In particular, if the source device wants to be supplied with a voltage of a level higher than a predetermined level of a voltage supplied at step S8020, it may be supplied with the required power by performing the power negotiation process of FIGS. 4 and 5.

FIG. 9 is a flowchart regarding the HDMI system in which power is supplied to the sink device, that is, a low/dead battery, according to an embodiment of the present invention. In this flowchart, the source device operates as a PSource device, and the sink device operates as a PSink device. The description given above with reference to FIGS. 2 to 8 may be identically applied to this flowchart.

First, when the source device and the sink device are connected through an HDMI cable, the source device may transmit a +5 V signal to the sink device (S9010).

Next, the source device may check whether an HPD signal is detected from the sink device (S9020). If the sink device having the amount of remaining battery power receives a +5 V signal from the source device, it transmits an HPD signal to the source device as a response to the +5 V signal. If the sink device having the amount of remaining battery power of less than a predetermined level (i.e., the sink device, that is, a low/dead battery) cannot transmit an HPD signal to the source device because it cannot switch an HPD line from a low level to a high level. Accordingly, after transmitting the +5 V signal, the source device may determine whether the sink device is in a low/dead battery state based on whether an HPD signal is detected for a predetermined time. In the present embodiment, the sink device cannot transmit an HPD signal to the source device because it is in the low/dead battery state. As a result, the source device cannot detect an HPD signal (or it cannot receive an HPD signal).

Next, the source device may supply power of a predetermined power level (or a default voltage and current) to the sink device (S9030). In this case, the predetermined power level may be determined to be a minimum power level that is required to perform a power negotiation with the source device.

Next, the source device may transmit a +5 V signal to the sink device (S9040).

Next, the sink device may transmit a Hot Plug Detect (HPD) signal to the source device (S9050). The sink device may become the state in which it can transmit the HPD signal to the source device because it has been supplied with power from the sink device at step S9040 and thus the power source of the sink device has been activated (or on). Accordingly, the sink device may switch the HPD line from a low level to a high level, and thus the HDMI cable is normally connected. Accordingly, the EDID-related circuit of the sink device is activated, and thus the sink device may notify the source device that the EDID information can be accessed. As a result, the source device may receive the EDID information from the activated sink device.

Next, the source device and the sink device may perform the power negotiation according to the flowchart of FIGS. 4 and 5 and a power supply operation according to the results of the power negotiation. That is, the HDMI system may perform the operation of the flowchart of FIGS. 4 and 5 as the next operation of step S9050. In particular, if the sink device wants to be supplied with a voltage of a level higher than a predetermined level of a voltage supplied at step S9030, it may be supplied with the required power by performing the power negotiation process of FIGS. 4 and 5.

The power supply protocols in the HDMI system according to the embodiments of the present invention have been described above. HF-VSDB parameters and SCDC parameters used in the power supply protocols according to the aforementioned embodiments are described below.

1. HF-VSDB Parameter (1) Function

A PSource field (power-suppliable information) (1 bit): when it is set to "1", it indicates that the sink device is capable of providing power). That is, when the PSource field is set to "1", it indicates that the sink device functions as a PSource.

A PSink field (power-receivable information) (1 bit): when it is set to "1", it indicates that the sink device is willing to consume power). That is, when the Psink field is set to "1", it indicates that the sink device functions as a PSink.

When both the PSource field and the PSink field are set to "1", it may indicate that the sink device functions as a dual device.

(2) A Power Supply Ability

A voltage level field (3 bits): 0 (3.3 V), 1 (5 V), 2 (9 V), 3 (12 V), 4 (20 V), 5~7: reserved for future use.

A current level field (2 bits): 0 (1 A), 1 (2 A), 2~3: reserved for future use

When the PSource field is set to "1", it indicates that a voltage of a level indicated in the voltage level field and current of a level indicated in the current level field are maximum power levels which can be supplied by the sink device.

When the PSink field is set to "1", it indicates that a voltage of a level indicated in the voltage level field and current of a level indicated in the current level field are minimum power levels consumed (requested) by the sink device.

2. SCDC Parameter

A Power_Required_Source bit (i.e., a request field) (1 bit)

When the Power_Required_Source bit is set to "1", it indicates that the source device (or a PSink device) requires that power be supplied thereto (or indicates that the sink device has to function as a PSource device).

A Power_Required_Sink bit (i.e., a request field) (1 bit)

When the Power_Required_Sink bit is set to "1", it indicates that the sink device (or a PSink device) requires that power be supplied thereto (or indicates that the sink device functions as a PSink device).

A Power_Supply_Ready bit (i.e., a preparation completion field) (1 bit)

When the Power_Supply_Ready bit is set to "1", it indicates that the sink/source device, that is, a PSource device, has been ready to supply power.

A Power_Supply_Status bit (i.e., a supply status field) (1 bit)

When the Power_Supply_Status bit is set to "1", it indicates that the sink or source device, that is, a PSink device, has not detected the reception of power.

A Power Configuration Register (i.e., a required power characteristic field) (5 bits, a write-only register)

This indicates a voltage/power level that the source device wants to be supplied if the source device operates as a PSink device.

The aforementioned fields are only examples, and the bit size and field name may be differently determined according to an embodiment. Furthermore, the bit value set to indicate specific information has been illustrated as being set to "1", but may be set as a different value according to an embodiment. Furthermore, the fields may be combined into one and indicate specific information according to an embodiment.

An Embodiment in which the Source Device Operates as a PSink Device and the Sink Device Operates as a PSource Device FIG. 10 is a flowchart illustrating a method for transmitting and receiving power through an HDMI according to a first embodiment of the present invention. In particular, FIG. 10 is a flowchart regarding an embodiment in which the source device operates as a PSink device and the sink device operates as a PSource device. In this case, the sink device matches up pieces of power characteristic information.

First, the source device and the sink device are connected through an HDMI cable (S10000). When the HDMI cable is connected, the source device switches a power line of +5 V from a low level to a high level and applies an electric current (S10010). Accordingly, the source device may drive EEPROM in which the EDID information of the sink device has been stored and related circuits.

Next, the sink device switches a Hot Plug Detect (HPD) line from a low level to a high level (S10020), so the HDMI cable is normally connected and an EDID-related circuit is activated. Accordingly, the sink device may notify the source device that the EDID information may be accessed.

Next, the source device may transmit an EDID information read request to the sink device through a DDC (S10030).

Next, the sink device that has received the EDID information read request may transmit the EDID information, including power delivery support information, to the source device through the DDC (S10040). The power delivery support information may include information about whether the sink device supports power delivery and/or information regarding that the sink device supports power delivery of what level. In other words, the power delivery support information may include delivery support information indicating whether the sink device supports power delivery and/or support power characteristic information indicative of supported power. As described above, such EDID information may be read from EEPROM and transmitted in the form of an HF-VSDB.

Next, the source device may parse the received EDID information, and may check whether the sink device supports power delivery (S10050). If the sink device supports power delivery, the source device may arrange power delivery by transmitting power delivery request information (S10060).

The power delivery request information may include required power characteristic information of the source device. The required power characteristic information may indicate a power level or the amount of power which may be requested or received by the source device. The transmission itself of the required power characteristic information may indicate that the source device supports power delivery. In this specification, the required power characteristic information may indicate the required power level of the source device in a volt unit or watt unit.

The sink device may determine whether power transmission is possible by comparing or matching the required power characteristic information, received from the source device, with the support power characteristic information supported by the sink device (S10070). The sink device may transmit information about whether power transmission according to the matching of the power information is possible and/or matched power characteristic information to the source device (or the sink device may notify the source device that it has been ready to provide power in a matched level) as a response to the arrangement request (S10080). Furthermore, the sink device may start power transmission/delivery if power transmission is possible (S10090). In this case, the sink device may transmit power of a level, matched between the required power characteristic information received from the source device and the support power characteristic information of the sink device, to the source device.

In some embodiments, some of the steps included in this flowchart may be omitted or a new step may be added to the steps, and the sequence of the steps may be changed. Furthermore, some of the steps included in the flowchart may be performed as subsequent procedures connected to some steps included in a flowchart to be described later, or may be performed as prior procedures performed prior to the steps.

An embodiment in which steps S10060 and S10080 are performed using the SCDCS of the sink device is described in more detail below with reference to FIGS. 11 and 12.

FIG. 11 is a flowchart illustrating the method for transmitting and receiving power through an HDMI according to the first embodiment of the present invention, and shows a method for transmitting and receiving power using the SCDC (or SCDCS).

FIG. 11 is a diagram, in more detail, illustrating a method for performing step S10060 of FIG. 10 using the SCDC. Steps S11000~S11050 and S11070~S11090 of FIG. 11 correspond to steps S10000~S10050 and S10070~10090 of FIG. 10, respectively, and thus a redundant description thereof is omitted.

In step S10060 (corresponding to step S11060) of FIG. 10, the source device transmits power delivery request information that needs to be received by the source device to the sink device in order to arrange power delivery. The power delivery request information includes required power characteristic information of the source device. The transmission of the power delivery request information/required power characteristic information may be performed using the SCDC. To this end, in an embodiment of the present invention, power delivery configuration registers are configured in the SCDCS. The power delivery configuration register may also be called a power request register. The power delivery request information may be implemented in the form of an SCDC write message including the required power characteristic information.

The source device may transmit an SCDC write message that configures required power in the SCDC of the sink device (S11060). An embodiment of the SCDC write message for configuring the required power characteristic information is the same as FIG. 11(a), and the SCDC write message corresponds to the power delivery request information of FIG. 10.

The SCDC write message for configuring the required power characteristic information in FIG. 11(a), that is, the power delivery request information, may include an offset field "Sub-Address=power request register offset" indicative of the location of the power delivery configuration registers in the SCDCS and a data field "Data=Required Voltage (required power characteristic information)" indicative of the required power of the source device. In other words, the power delivery request information may include the offset information of the power delivery configuration registers and the required power characteristic information.

In this case, the required power characteristic information may be signaled so that the power level requested by the source device is included (or indicated) in a volt unit (V) or a watt unit (W). For example, if an electric current transmitted by the sink device is fixed to a constant level, the required power characteristic information may be signaled so that it includes the power level requested by the source device in a volt unit. If an electric current transmitted by the sink device is not fixed to a constant level, however, the required power characteristic information may be signaled so that it includes the power level requested by the source device in a watt unit. The required power characteristic information signaled as described above is included in the SCDC write message and transmitted to the sink device.

FIG. 11(b) shows an embodiment of the power delivery configuration registers. The reserved offset "Reserved for Configuration (0x31-0x3F) or Reserved (All Remaining Offsets)" of the SCDCS may be allocated as the offset of the power delivery configuration registers.

The sink device that has received the SCDC write message may write the required power characteristic information (i.e., the power level requested by the source device from the sink device), included in the SCDC write message, in the power delivery configuration registers. In this case, the required power characteristic information may be written in the power delivery configuration registers in a volt unit or watt unit. For example, if the required power characteristic information has been signaled and received in a volt unit, it may be written in the power delivery configuration registers in a volt unit. If the required power characteristic information has been signaled and received in a watt unit, it may be written in the power delivery configuration registers in a watt unit.

More specifically, for example, referring to FIG. 11(b), if the required power characteristic information has been written in a volt unit, bits 0~4 of the power delivery configuration registers may be allocated to write the required power characteristic information. In this case, the bits 0~4 may correspond to 3.3 V, 5 V, 9 V, and 12 V or a vendor-defined field, respectively. In this case, the sink device may write the required power characteristic information of the source device (or the power delivery request information) in the SCDCS by setting a bit value of a field, corresponding to the power level requested by the source device, to "1." If a field corresponding to the power level requested by the source device is not present in the power delivery configuration registers, the sink device may set a bit value of the vendor-defined field to "1", and may directly write a voltage, requested by the source device, explicitly or implicitly in a vendor-defined voltage register of FIG. 11(c) to be described below.

FIG. 11(c) shows an embodiment of the vendor-defined voltage register. The offset of the vendor-defined voltage register may be allocated to the reserved offset "Reserved for Configuration (0x31-0x3F) or Reserved (All remaining Offsets)" of the SCDCS. A plurality of bits may be allocated to the vendor-defined voltage register in order to indicate a different voltage (i.e., a vendor-defined voltage) not indicated in the power delivery configuration registers.

Referring to FIG. 11(c), bits 0~7 of the vendor-defined voltage register may be allocated to write a vendor-defined voltage. The bits 7~3 of the bits 0~7 may be allocated to indicate a voltage of up to 12 V in a resolution 1 V unit, and the bits 2~0 thereof may be allocated to indicate a voltage in a resolution 0.2 V unit. For example, in the bits 7~3, 0001 may be indicative of 1 V, 0010 may be indicative of 2 V, and 0011 may be indicative of 3 V. In the bits 2~0, 000 may be indicative of 0.0 V, 001 may be indicative of 0.2 V, and 010 may be additionally indicative of 0.4V.

For another example, although not shown in this figure, if the required power characteristic information has been signaled in a watt unit, bits 0~3 of the power delivery configuration registers may be allocated to write the required power characteristic information. In this case, the bits 0~3 may correspond to 0 W, 10 W, and 20 W or a vendor-defined field, respectively. The sink device may write the required power characteristic information of the source device (or the power delivery request information) in the SCDCS by setting the bit value of a field corresponding to the power level requested by the source device to "1." If a field corresponding to the power level requested by the source device is not present in the power delivery configuration registers, the sink device may set the bit value of the vendor-defined field to "1", and may directly write the power level requested by the source device explicitly or implicitly using the vendor-defined voltage register as in FIG. 11 (c).

If the required power characteristic information has been written in the power delivery configuration registers in a byte unit not a bit unit (i.e., if all of the bits 0~7 of the power delivery configuration registers have been allocated to write the required power characteristic information), the sink device may write a value, corresponding to the power level requested by the source device, in the power delivery configuration registers explicitly as the required power characteristic information. For example, when a request for power of 0 W is received from the source device, the sink device may write "0" (00000000) in the power delivery configuration registers. When a request for power of 10 W is received, the sink device may write "1" (00000001) in the power delivery configuration registers. When a request for power of 20 W, the sink device may write "2" (00000010) in the power delivery configuration registers.

As described above, the source device may transmit the power delivery request information, that is, the SCDC write message including the required power characteristic information, to the sink device. The source device may write a power level capable of being received by the source device (or a power level whose transmission is requested from the sink device) in the SCDCS registers of the sink device in a volt or watt unit through the SCDC write message. The sink device may obtain the required power characteristic information of the source device through the SCDCS registers, may match up the obtained required power characteristic information and its own support power characteristic information, and may transmit power of at least one of matched power levels. If a plurality of power levels matched between the source device and the sink device is present, the sink device may transmit the highest power for efficiency or may transmit middle or low power for stability. This may be determined by the predetermined setting of the control unit.

FIG. 12 is a flowchart illustrating the method for transmitting and receiving power through an HDMI according to the first embodiment of the present invention, and shows a method for transmitting and receiving power using an SCDC.

FIG. 12 is a diagram, in more detail, illustrating a method for performing step S10080 of FIG. 10 using the SCDC. Steps S12000~S12070 and S12090 of FIG. 12 correspond to steps S10000~S10070 and S10090 of FIG. 10, respectively, and thus a redundant description thereof is omitted.

In step S10080 of FIG. 10 (corresponding to step S12080), the sink device transmits a response to the power delivery arrangement to the source device (or the sink device may notify the source device that it has been ready to provide power in a level matched with the power level requested by the source device). This may be performed using the SCDC and is described below. To this end, in an embodiment of the present invention, power-ready information or transmission power information is implemented in the status flag register of the SCDCS. Furthermore, a response to the power delivery request information is implemented in the form of an SCDC read message.

The sink device may notify the source device of the update of the power-ready information or transmission power information and allow the source device to read the updated information from the SCDCS by transmitting an SCDC update read message (S12080-1) and transmitting an SCDC status read message (S12080-2). In this case, the power-ready information or the transmission power information may be included in a status flag register as a single field, and may consist of a bit size of 1 bit or more.

FIG. 12(a) shows an embodiment of the status flag register. The status flag register may include the power-ready ("power_ready") information or transmission power information depending on an embodiment. In an embodiment, the power-ready information or the transmission power information may be located at the offset 0x41 of the SCDCS.

The power-ready information may indicate whether the sink device is capable of supplying power of a level requested by the source device. The sink device may match up the required power characteristic information, received from the source device, and its own support power characteristic information by comparing the received required power characteristic information with its own support power characteristic information (S12070). If, as a result of the matching, the sink device is found to be capable of supporting (supplying or transmitting) power of a level requested by the source device, the sink device may update a value of a field corresponding to the power-ready information with "1." In this case, the sink device may notify the source device of the update of the power-ready information by transmitting an SCDC update read message to the source device (S12080-1), and may transmit an SCDC status read message (S12080-2) to the source device so that the source device can read the updated power-ready information and is prepared to receive the power.

The transmission power information may be indicative of the amount of power capable of being transmitted (or supported or supplied) by the sink device or the amount of power that is being transmitted by the sink device. The sink device may match up the required power characteristic information, received from the source device, and its own support power characteristic information by comparing the received required power characteristic information with its own support power characteristic information (S12070). If, as a result of the matching, the sink device is found to be capable of supporting (or supplying/transmitting) the required power level of the source device, the sink device may write (or update) transmission power information indicative of a power level supported/to be supported/being supported by the sink device in the status flag register. Accordingly, the power level indicated by the transmission power information written in the status flag register may be the same as the power level indicated by the required power characteristic information of the source device.

A method for writing the transmission power information in the status flag register may be the same as the method for writing the required power characteristic information in the power delivery configuration registers, which has been described above with reference to FIG. 11. Accordingly, the transmission power information may be indicative of the power level supported by the sink device in a volt or watt unit and may be written in the status flag register in a bit unit or byte unit.

If the sink device directly writes transmission power information about a power level supported by the sink device in the SCDCS explicitly as described above, there are advantages in that the source device can be supplied with power from the sink device more stably and can negotiate with the sink device about a power level in real time.

For example, an event in which the source device wants to change a power level to be received from the sink device, such as if the source device switches from common charging mode to fast charging mode (i.e., if the source device switches to mode that requires charging of a high speed) or if charging of a predetermined level or more is completed and thus a supplied power level is to be reduced, may be generated.

In this case, when the event is generated, first, the source device may read transmission power information about a power level, being transmitted by the sink device, from the SCDC of the sink device in order to check whether it is supplied with power of a proper level. For example, the source device may need to check information about a power level that is being supplied by the sink device in order to check whether a currently received power level is a maximum if the source device wants to increase a power level supplied thereto or in order to check whether a currently received power level is a minimum if the source device wants to decrease a power level supplied thereto.

As a result, the source device can be aware that how much power is now supplied thereto. Accordingly, there is an advantage in that the source device can return to step S12060 and negotiate with the sink device about a supplied power level if the source device wants to increase or decrease a power level supplied thereto.

FIG. 12(b) shows the SCDC update read message. The SCDC update read message includes the address "Slv Addr=0x54" of the sink device and update information "Update_0 and Update_1." The sink device may notify the source device that an update has occurred in the SCDCS of the sink device by transmitting the SCDC update read message to the source device.

FIG. 12(c) shows the SCDC status read message. The SCDC status read message may include address information "Slv Addr=0x54" of the sink device, a register value "0x41" of information to be read, and information about data to be read "Data=0x04 or 0x02 or 0x01." The sink device may notify the source device of an updated status field by transmitting the SCDC status read message to the source device. The source device may read (or obtain) the power-ready information or the transmission power information by reading the status field (or a status register "status_1 register"), spaced apart from 0x54 of the sink device having the slave address of 0x54 at an interval of 0x41, based on the SCDC status read message.

If the power-ready information obtained from the sink device is "1", the source device may determine that power transmission of the sink device has been prepared based on the power level requested by the source device, and may prepare/wait for power delivery. In an embodiment, if a power level indicated by transmission power information obtained from the sink device is the same as a power level requested by the source device, the source device determines that power transmission of the sink device has been prepared and prepares/waits for power delivery.

Finally, the sink device transmits power of the matched power level, and the source device received the corresponding power (S12090).

FIG. 13 is a flowchart illustrating a method for transmitting and receiving power through an HDMI according to a second embodiment of the present invention. In particular, FIG. 13 is a flowchart regarding an embodiment in which the source device operates as a PSink device, and the sink device operates as a PSource device. In this case, the source device matches up pieces of power characteristic information.

The description given in relation to FIG. 10 may be identically applied to the flowchart of FIG. 13. In particular, steps S13000~S13050 of FIG. 13 correspond to steps S10000~S10050 of FIG. 10, and steps S13080 and S13090 thereof correspond to steps S10080 and S10090 of FIG. 10. Accordingly, differences between the flowchart of FIG. 13 and the flowchart of FIG. 10 are chiefly described, and thus a redundant description thereof is omitted.

Referring to FIG. 13, step S10070 in which pieces of power characteristic information are matched in FIG. 10 may be performed by the source device not the sink device (S13060). The source device may compare or match the support power characteristic information of the sink device, obtained through EDID, with the required power characteristic information of the source device, and may transmit the matched power characteristic information to the sink device (S13070). In this specification, the matched power characteristic information may be denoted as matched power capability information.

The matched power characteristic information (or matching power characteristic information) includes information about a power level matched between required power characteristic information about a power level requested by the source device and support power characteristic information about a power level supported by the sink device. In other words, the matched power characteristic information includes a power level that belongs to power levels capable of being supported by the sink device and that is matched with a power level requested by the source device. For example, if the required power characteristic information of the source device includes 5 W and 10 W and the support power characteristic information of the sink device includes 10 W and 20 W, matched power characteristic information includes 10 W. In this specification, it may represent that "the matched power characteristic information indicates (or includes/denotes) a power level matched between the source device and the sink device."

In this case, the matched power characteristic information is also transmitted by the source device, and may correspond to one of power levels included in the required power characteristic information of the source device. Accordingly, in this specification, the matched power characteristic information may be called required power characteristic information. The reason for this is that the matched power characteristic information also corresponds to power characteristic information whose reception is requested by the source device. If power characteristic matching is additionally performed in the source device, it may be called matched power characteristic information, if necessary.

The sink device may be prepared to transmit power in the level matched with the source device as described above, and may notify the source device that it has been ready to transmit power (S13080). Finally, the sink device transmits the power of the matched level to the source device (S13090).

In some embodiments, some of the steps included in this flowchart may be omitted or a new step may be added to the steps, and the sequence of the steps may be changed. Furthermore, some of the steps included in the flowchart may be performed as subsequent procedures connected to some steps included in a flowchart to be described later, or may be performed as prior procedures performed prior to the steps.

An embodiment in which steps S13070 and S13080 are performed using the SCDCS of the sink device is described in more detail below with reference to FIGS. 14 and 15.

FIG. 14 is a flowchart illustrating the method for transmitting and receiving power through an HDMI according to the second embodiment of the present invention, and shows a method for transmitting and receiving power using the SCDC (or SCDCS).

FIG. 14 is a diagram, in more detail, illustrating a method for performing step S13070 of FIG. 13 using the SCDC. Steps S14000~S14060 and S14080~S14090 of FIG. 14 correspond to steps S13000~S13060 and S13080~13090 of FIG. 10, respectively, and thus a redundant description thereof is omitted. Furthermore, the description given in relation to FIG. 11 may be applied to this figure identically or similarly.

In step S13070 (corresponding to step S14070) of FIG. 13, the source device transmits the matched power characteristic information to the sink device in order to receive proper power. This may be performed using the SCDC and described below. To this end, an embodiment of the present invention implements power delivery configuration registers in the SCDCS. The power delivery configuration register may also be called a power request register. Furthermore, the matched power characteristic information may be implemented in the form of an SCDC write message.

The source device may transmit an SCDC write message, instructing that the matched power is configured in the SCDC of the sink device, to the sink device (S14070). An embodiment of the SCDC write message for configuring power information is the same as that of FIG. 14(a). The SCDC write message includes the matched power characteristic information described with reference to FIG. 13.

The SCDC write message for configuring the power characteristic information of FIG. 14(a), that is, the matched power characteristic information, may include an offset field "Sub-Address=power request register offset" indicative of the location of the power delivery configuration registers in the SCDCS and a data field "Data=Required Voltage; matched power information" indicative of the matched power level. In other words, the matched power characteristic information may include the offset information of the power delivery configuration registers and the matched power characteristic information.

In this case, the transmitted matched power characteristic information may be signaled so that it includes the power level matched between the source device and the sink device in a volt unit (V) or a watt unit (W). For example, if an electric current transmitted by the sink device is fixed to a constant level, the matched power characteristic information may be signaled so that it includes the power level matched between the two devices in a volt unit. If an electric current transmitted by the sink device is not fixed to a constant level, however, the matched power characteristic information may be signaled so that it includes the power level matched between the two devices in a watt unit. The matched power characteristic information signaled as described above is included in the SCDC write message and transmitted to the sink device.

FIG. 14(b) shows an embodiment of the power delivery configuration registers. In an embodiment, the reserved offset "Reserved for Configuration (0x31-0x3F) or Reserved (All remaining Offsets)" of the SCDCS may be allocated as the offset of the power delivery configuration registers.

The sink device that has received the SCDC write message may write the matched power characteristic information, included in the SCDC write message, in the power delivery configuration registers. In this case, the matched power characteristic information may be written in the power delivery configuration registers in a volt unit or watt unit. For example, if the matched power characteristic information is signaled and received in a volt unit, it may be written in the power delivery configuration registers in a volt unit. If the matched power characteristic information is signaled and received in a watt unit, it may be written in a watt unit.

More specifically, for example, referring to FIG. 14(b), if the matched power characteristic information is written in a volt unit, bits 0~4 of the power delivery configuration registers may be allocated to write the matched power characteristic information. In this case, the bits 0~4 may correspond to 3.3 V, 5 V, 9 V, and 12 V or a vendor-defined field, respectively. The sink device may write the matched power characteristic information, received from the source device, in the SCDCS by setting the bit value of a field, corresponding to the matched power level, to "1." If a field corresponding to the matched power level (i.e., a volt unit) is not present in the power delivery configuration registers, the sink device may set the bit value of the vendor-defined field to "1", and may directly write the matched power level in a vendor-defined voltage register of FIG. 14(c) to be described below.

FIG. 14(c) shows an embodiment of the vendor-defined voltage register. The offset of the vendor-defined voltage register may be allocated to the reserved offset "Reserved for Configuration (0x31-0x3F) or Reserved (All remaining Offsets)" of the SCDCS. A plurality of bits may be allocated to the vendor-defined voltage register in order to indicate a different voltage (e.g., a vendor-defined voltage) not indicated in the power delivery configuration registers.

Referring to FIG. 14(c), the bits 0~7 of the vendor-defined voltage register may be allocated to write the vendor-defined voltage. The bits 7~3 of the bits 0~7 may be allocated to indicate a voltage of up to 12 V in a resolution 1 V unit, and the bits 2~0 thereof may be allocated to indicate a voltage in a resolution 0.2 V unit. For example, in the bits 7~3, 0001 may be indicative of 1 V, 0010 may be indicative of 2 V, and 0011 may be indicative of 3 V. In the bits 2~0, 000 may be indicative of 0.0 V, 001 may be indicative of 0.2 V, and 010 may be additionally indicative of 0.4 V.

For another example, although not shown in this figure, if the matched power characteristic information is signaled in a watt unit, bits 0~3 of the power delivery configuration registers may be allocated to write the matched power characteristic information. In this case, the bits 0~3 may correspond to 0 W, 10 W, and 20 W or a vendor-defined field, respectively. The sink device may write the matched power characteristic information in the SCDCS by setting the bit value of a field, corresponding to the power level matched with that of the source device, to "1." If a field corresponding to the power level matched with that of the source device is not present in the vendor-defined voltage register, the sink device may set the bit value of the vendor-defined field to "1", and may directly write the power level matched with that of the source device explicitly using the vendor-defined voltage register as in FIG. 14(c).

If the matched power characteristic information is written in the power delivery configuration registers in a byte unit not a bit unit (i.e., if all the bits 0~7 of the power delivery configuration registers are allocated to write the matched power characteristic information), the sink device may explicitly write a value, corresponding to the power level matched with that of the source device, in the power delivery configuration registers as the matched power characteristic information. For example, the sink device may write "0" (00000000) in the power delivery configuration registers if the power level matched with that of the source device is 0 W, may write "1" (00000001) in the power delivery configuration registers if the power level matched with that of the source device is 10 W, and may write "2" (00000010) in the power delivery configuration registers if the power level matched with that of the source device is 20 W.

As described above, the source device may transmit the SCDC write message, including the power level matched with that of the sink device, to the sink device. The source device may write the power level matched between the two devices in the SCDCS registers of the sink device in a volt or watt unit through the SCDC write message. The sink device may obtain the matched power characteristic information through the SCDCS registers, and may be prepared to transmit power of at least one of power levels indicated by the obtained matched power characteristic information (S14080). Furthermore, the sink device may transmit power of a corresponding level to the source device (S14090). If a plurality of power levels matched between the source device and the sink device is present, the sink device may transmit the highest power for efficiency or may transmit middle or low power for stability. This may be determined by the predetermined setting of the control unit.

FIG. 15 is a flowchart illustrating the method for transmitting and receiving power through an HDMI according to the second embodiment of the present invention, and shows a method for transmitting and receiving power using an SCDC.

FIG. 15 is a diagram, in more detail, illustrating a method for performing step S13080 of FIG. 13 using the SCDC. Steps S15000~S15070 and S15090 of FIG. 15 correspond to steps S13000~S13070 and S13090 of FIG. 13, respectively, and thus a redundant description thereof is omitted. Furthermore, the description given in relation to FIG. 12 may be applied to this figure identically or similarly.

In step S13080 (corresponding to steps S15080-1 and S15080-2) of FIG. 13, the sink device may notify the source device that it has been ready to provide the power of a level matched with that of the source device. This may be performed using the SCDC and is described below. To this end, in an embodiment of the present invention, power-ready information or transmission power information is implemented in the status flag register of the SCDCS.

Furthermore, a response to the matched power characteristic information is implemented in the form of an SCDC read message.

The sink device may notify the source device that the power-ready information or the transmission power information has been updated and that the source device may read the updated information from the SCDCS by transmitting an SCDC update read message (S15080-1) and transmitting an SCDC status read message (S15080-2). In this case, the power-ready information or the transmission power information may be included in a status flag register as a single field, and may have a bit size of 1 bit or more.

FIG. 15(a) shows an embodiment of the status flag register. In an embodiment, the status flag register may include the power-ready ("power_ready") information or the transmission power information. In an embodiment, the power-ready information or the transmission power information may be located at the offset 0x41 of the SCDCS.

The power-ready information may indicate whether the sink device is capable of supplying power of a level matched with that of the source device. If the sink device is capable of supplying power of a level matched with that of the source device and/or has been ready to supply the power of the matched level, it may update the value of a field corresponding to the power-ready information with "1." In this case, the sink device may notify the source device of the update of the power-ready information by transmitting the SCDC update read message to the source device (S15080-1), and may transmit the SCDC status read message to the source device (S15080-2). Accordingly, the source device may read the updated power-ready information and receive power (S15090).

The transmission power information may indicate the amount of power transmitted (or supported/supplied) by the sink device or the amount of power being transmitted by the sink device. If the sink device has been ready to supply power of a level matched with that of the source device, it may write (or update) the transmission power information indicative of a power level to be supplied (or supplied/being supplied) by the sink device in a status flag register. Accordingly, the power level indicated by the transmission power information written in the status flag register may be the same as that indicated by the matched power characteristic information.

A method for writing the transmission power information in the status flag register may be the same as the method for writing the matched power characteristic information in the power delivery configuration registers, which has been described with reference to FIG. 14.

Accordingly, the transmission power information may indicate the power level to be supplied/supplied/being supplied by the sink device in a volt or watt unit, and may be written in the status flag register in a bit unit or a byte unit.

If the sink device directly writes transmission power information about a power level capable of being supported by the sink device in the SCDCS explicitly as described above, there are advantages in that the source device can be stably supplied with power from the sink device and can negotiate with the sink device about a power level in real time, as described above with reference to FIG. 12.

FIG. 15(b) shows the SCDC update read message. The SCDC update read message includes the address "Slv Addr=0x54" of the sink device and update information "Update_0 and Update_1." The sink device may notify the source device that an update has occurred in the SCDCS of the sink device by transmitting the SCDC update read message to the source device.

FIG. 15(c) shows the SCDC status read message. The SCDC status read message may include address information "Slv Addr=0x54" of the sink device, the register value "0x41" of information to be read, and information about data to be read "Data=0x04 or 0x02 or 0x01." The sink device may notify the source device of an updated status field by transmitting the SCDC status read message to the source device. The source device may read (or obtain) power-ready information or transmission power information by reading the status field (or a status register "status_1 register"), spaced apart from 0x54 of the sink device having the slave address of 0x54 at an interval of 0x41, based on the SCDC status read message.

If the power-ready information obtained from the sink device is "1", the source device may determine that the sink device has been ready to transmit the power of the matched level and may be ready for or wait for power delivery. In an embodiment, if a power level indicated by the transmission power information obtained from the sink device is the same as the matched power level, the source device determines that the sink device has been ready to transmit power and prepares/waits for power delivery.

Finally, the sink device transmits power of the matched level, and the source device receives the corresponding power (S15090).

An Embodiment in which the Source Device Operates as s PSource Device and the Sink Device Operates as a PSink Device FIG. 16 is a flowchart illustrating a method for transmitting and receiving power through an HDMI according to a third embodiment of the present invention. In particular, FIG. 16 is a flowchart regarding an embodiment in which the source device operates as a PSource device and the sink device operates as a PSink device. In this case, the sink device matches up pieces of power characteristic information.

First, the source device and the sink device are connected through an HDMI cable (S16000). When the HDMI cable is connected, the source device switches a power line of +5 V from a low level to a high level and applies an electric current (S16010). Accordingly, the source device can drive EEPROM in which the EDID information of the sink device has been stored and related circuits.

Next, the sink device switches a Hot Plug Detect (HPD) line from a low level to a high level (S16020), and thus the HDMI cable is normally connected and an EDID-related circuit is activated. Accordingly, the sink device may notify the source device that the EDID information can be accessed.

Next, the source device may transmit an EDID information read request to the sink device through a DDC (S16030).

Next, the sink device that has received the EDID information read request may transmit EDID information, including power reception support information (power delivery support information), to the source device through the DDC (S16040). The power reception support information may include information about whether the sink device is capable of receiving power from the source device and/or information regarding that the sink device is capable of receiving power of what level. In other words, the power reception support information may include reception support information indicating whether the sink device supports power reception and/or reception power characteristic information indicative of a received power level. As described above, the EDID information may be read from the EEPROM and transmitted in the form of an HF-VSDB.

Next, the source device may parse the received EDID information and may check whether the sink device supports power reception (S16050). If the sink device supports power reception, the source device may arrange power delivery by transmitting the power delivery support information to the sink device (S16060).

The power delivery support information may include support power characteristic information of the source device. The support power characteristic information may indicate a power level or the amount of power supported by or capable of being supported by the source device. The transmission itself of the support power characteristic information may indicate that the source device supports the supply/transmission of power. In this specification, the support power characteristic information may indicate the supported power level of the source device in a volt unit or watt unit.

The sink device may determine whether power reception is possible by comparing/matching the support power characteristic information, received from the source device, with the reception power characteristic information capable of being received by the sink device (S16070). The sink device may transmit information about whether power reception according to the matching of power information is possible and/or matched power characteristic information to the source device (or the sink device may notify the source device that it has been ready to receive power in a matched level) as a response to an arrangement request (S16080). Furthermore, if power transmission is possible, the source device may start power transmission/delivery (S16090). In this case, the sink device may transmit power of a level, matched between the support power characteristic information received from the source device and the reception power characteristic information of the sink device, to the source device.

In some embodiments, some of the steps included in this flowchart may be omitted or a new step may be added to the steps, and the sequence of the steps may be changed. Furthermore, some of the steps included in the flowchart may be performed as subsequent procedures connected to some steps included in a flowchart to be described later, or may be performed as prior procedures performed prior to the steps.

An embodiment in which steps S16060 and S16080 are performed using the SCDCS of the sink device is described in more detail below with reference to FIGS. 17 and 18.

FIG. 17 is a flowchart illustrating the method for transmitting and receiving power through an HDMI according to the third embodiment of the present invention, and shows a method for transmitting and receiving power using the SCDC (or SCDCS).

FIG. 17 is a diagram, in more detail, illustrating a method for performing step S16060 of FIG. 16 using the SCDC. Steps S17000~S17050 and S17070~S17090 of FIG. 17 correspond to steps S16000~S16050 and S16070~16090 of FIG. 16, respectively, and thus a redundant description thereof is omitted.

In step S16060 (corresponding to step S17060) of FIG. 16, the source device transmits power delivery support information, supported by the source device, the sink device in order to arrange power delivery. The power delivery support information includes support power characteristic information of the source device. The transmission of the power delivery support information/support power characteristic information may be performed using the SCDC.

To this end, in an embodiment of the present invention, power delivery configuration registers are configured in the SCDCS. The power delivery configuration register may also be called a power support register. The power delivery configuration registers may be configured using the same registers as those described with reference to FIGS. 10 to 15 or may be configured using registers different from those described with reference to FIGS. 10 to 15. If the power delivery configuration registers are configured using registers different from those described with reference to FIGS. 10 to 15, the power delivery configuration registers described with reference to FIGS. 10 to 15 may be classified as power "request" registers, and the power delivery configuration registers described with reference to FIGS. 16 to 22 may be classified as power "support" registers. The power "request" registers and the power "support" registers may have different offsets.

The power delivery support information may be implemented in the form of an SCDC write message including the support power characteristic information.

The source device may transmit the SCDC write message for configuring support power in the SCDC of the sink device to the sink device (S17060). An embodiment of the SCDC write message for configuring the support power characteristic information is the same as FIG. 17(a). The SCDC write message corresponds to the power delivery support information of FIG. 16.

The SCDC write message for configuring the support power characteristic information of FIG. 17(a), that is, the power delivery support information, may include an offset field "Sub-Address=power request register offset" indicative of the location of the power delivery configuration registers in the SCDCS and a data field "Data=Required Voltage; the support power characteristic information" indicative of the supported power of the source device. In other words, the power delivery support information may include the offset information of the power delivery configuration registers and the support power characteristic information.

In this case, the support power characteristic information may be signaled so that it includes (denotes/indicates) a power level supported by the source device in a volt unit (V) or a watt unit (W). For example, if an electric current transmitted by the source device is fixed to a constant level, the support power characteristic information may be signaled so that it includes a power level supported by the source device in a volt unit. If an electric current transmitted by the source device is not fixed to a constant level, however, the support power characteristic information may be signaled so that it includes a power level supported by the source device in a watt unit. The support power characteristic information signaled as described above may be included in the SCDC write message and transmitted to the sink device.

FIG. 17(b) shows an embodiment of the power delivery configuration registers. The offset of the power delivery configuration registers may be allocated to the reserved offset "Reserved for Configuration (0x31-0x3F) or Reserved (All remaining Offsets)" of the SCDCS.

The sink device that has received the SCDC write message may write the support power characteristic information (i.e., the power level capable of being supported by the source device for the sink device), included in the SCDC write message, in the power delivery configuration registers. In this case, the support power characteristic information may be written in the power delivery configuration registers in a volt unit or watt unit. For example, if the support power characteristic information is signaled and received in a volt unit, it may be written in the power delivery configuration registers in a volt unit. If the support power characteristic information is signaled and received in a watt unit, it may be written in the power delivery configuration registers in a watt unit.

More specifically, for example, referring to FIG. 17(b), if the support power characteristic information is written in a volt unit, the bits 0~4 of the power delivery configuration registers may be allocated to write the support power characteristic information. In this case, the bits 0~4 may correspond to 3.3 V, 5 V, 9 V, and 12 V or a vendor-defined field, respectively. In this case, the sink device may write the support power characteristic information (or power delivery support information) of the source device in the SCDCS by setting the bit value of a field, corresponding to the power level supported by the source device, to "1." If a field corresponding to the power level supported by the source device is not present in the power delivery configuration registers, the sink device may set the bit value of the vendor-defined field to "1", and may directly write a voltage, supported by the source device, in the vendor-defined voltage register of FIG. 17(c) to be described below explicitly or implicitly.

FIG. 17(c) shows an embodiment of the vendor-defined voltage register. The offset of the vendor-defined voltage register may be allocated to the reserved offset "Reserved for Configuration (0x31-0x3F) or Reserved (All remaining Offsets)" of the SCDCS. A plurality of bits may be allocated to the vendor-defined voltage register in order to indicate a different voltage (e.g., a vendor-defined voltage) not indicated in the power delivery configuration registers.

Referring to FIG. 17(c), the bits 0~7 of the vendor-defined voltage register may be allocated to write the vendor-defined voltage. The bits 7~3 of the bits 0~7 may be allocated to indicate a voltage of up to 12 V in a resolution 1 V unit, and the bits 2~0 thereof may be allocated to indicate a voltage in a resolution 0.2 V unit. For example, in the bits 7~3, 0001 may be indicative of 1 V, 0010 may be indicative of 2 V, and 0011 may be indicative of 3 V. In the bits 2~0, 000 may be indicative of 0.0 V, 001 may be indicative of 0.2 V, and 010 may be additionally indicative of 0.4V.

For another example, although not shown in this figure, if the support power characteristic information has been signaled in a watt unit, the bits 0~3 of the power delivery configuration registers may be allocated to write the support power characteristic information. In this case, the bits 0~3 may correspond to 0 W, 10 W, and 20 W or a vendor-defined field, respectively. The sink device may write the support power characteristic information (or power delivery support information) of the source device in the SCDCS by setting the bit value of a field, corresponding to the power level supported by the source device, to "1." If a field corresponding to the power level supported by the source device is not present in the power delivery configuration registers, the sink device may set the bit value of the vendor-defined field to "1", and may directly write the power level, supported by the source device, explicitly or implicitly using the vendor-defined voltage register as in FIG. 17(c).

If the support power characteristic information is written in the power delivery configuration registers in a byte unit not a bit unit (i.e., if all of the bits 0~7 of the power delivery configuration registers are allocated to write the support power characteristic information), the sink device may explicitly write a value, corresponding to the power level supported by the source device, in the power delivery configuration registers as the support power characteristic information. For example, the sink device may write "0" (00000000) in the power delivery configuration registers if the source device supports power of 0 W, may write "1" (00000001) in the power delivery configuration registers if the source device supports power of 10 W, and may write "2" (00000010) in the power delivery configuration registers if the source device supports power of 20 W.

As described above, the source device may transmit the power delivery support information, that is, the SCDC write message including the support power characteristic information, to the sink device. The source device may write a power level, supported by the source device, in the SCDCS registers of the sink device in a volt or watt unit based on the SCDC write message. The sink device may obtain the support power characteristic information of the source device through the SCDCS registers, may match up the obtained support power characteristic information and its own reception power characteristic information, and may receive power of at least one of matched power levels. If a plurality of power levels is matched between the source device and the sink device, the sink device may receive the highest power for efficiency or may receive middle or low power for stability. This may be determined by the predetermined setting of the control unit.

FIG. 18 is a flowchart illustrating the method for transmitting and receiving power through an HDMI according to the third embodiment of the present invention, and shows a method for transmitting and receiving power using the SCDC.

FIG. 18 is a diagram, in more detail, illustrating a method for performing step S16080 of FIG. 16 using the SCDC. Steps S18000~S18070 and S18090 of FIG. 18 correspond to steps S16000~S16070 and S16090 of FIG. 16, respectively, and thus a redundant description thereof is omitted.

In step S16080 (corresponding to steps S18080-1 and S18080-2) of FIG. 16, the sink device transmits a response to the power delivery arrangement to the source device (or the sink device may notify the source device that it has been ready to receive power of a level matched with the power level supported by the source device). This may be performed using the SCDC and is described later. To this end, in an embodiment of the present invention, power-ready information or reception power information is implemented in the status flag register of the SCDCS. Furthermore, the response to the power delivery support information is implemented in the form of an SCDC read message.

The sink device may notify the source device that the power-ready information or reception power information has been updated and that the source device reads the updated information from the SCDCS by transmitting an SCDC update read message to (S18080-1) and transmitting an SCDC status read message (S18080-2). In this case, the power-ready information or reception power information may be included in the status flag register as a single field, and may have a bit size of 1 bit or more.

FIG. 18(a) shows an embodiment of the status flag register. In an embodiment, the status flag register may include power-ready ("power_ready") information or reception power information. In an embodiment, the power-ready information or reception power information may be located at the offset 0x41 of the SCDCS.

The power-ready information may indicate whether the sink device is capable of receiving power of a level supported by the source device. The sink device may match up the support power characteristic information, received from the source device, and its own reception power characteristic information by comparing the received support power characteristic information and its own reception power characteristic information (S18070). If, as a result of the matching, the sink device is found to be capable of receiving power of a level supported by the source device, the sink device may update the value of a field, corresponding to the power-ready information, with "1." In this case, the sink device may notify the source device of the update of the power-ready information by transmitting the SCDC update read message to the source device (S12080-1), and may transmit the SCDC status read message to the source device (S12080-2) so that the source device can read the updated power-ready information and is ready to transmit power.

The reception power information may be indicative of the amount of power capable of being received (or consumed) by the sink device or the amount of power that is being received (or consumed) by the sink device. The sink device may match up the support power characteristic information, received from the source device, and its own reception power characteristic information by comparing the received support power characteristic information and its own reception power characteristic information (S18070). If, as a result of the matching, the sink device is found to be capable of receiving (or consuming) the supported power level of the source device, the sink device may write (or update) reception power information indicative of a power level received/to be received/being received by the sink device in the status flag register. Accordingly, in this case, the power level indicated by the reception power information written in the status flag register may be the same as that indicated by the support power characteristic information of the source device.

A method for writing the reception power information in the status flag register may be the same as the method for writing the support power characteristic information in the power delivery configuration registers, which has been described with reference to FIG. 17. Accordingly, the reception power information may be indicative of a power level received by the sink device in a volt or watt unit and may be written in the status flag register in a bit unit or a byte unit.

If the sink device directly writes reception power information about the level of power, received by the sink device, in the SCDCS explicitly as described above, there are advantages in that the sink device can be stably supplied with power from the source device and can negotiate with the source device about a power level in real time as described above.

FIG. 18(b) shows the SCDC update read message. The SCDC update read message includes the address "Sly Addr=0x54" of the sink device and update information "Update_0 and Update_1." The sink device may notify the source device that an update has occurred in the SCDCS of the sink device by transmitting the SCDC update read message.

FIG. 18(c) shows the SCDC status read message. The SCDC status read message may include address information "Sly Addr=0x54" of the sink device, the register value "0x41" of information to be read, and information "Data=0x04 or 0x02 or 0x01" about data to be read. The sink device may notify the source device of an updated status field by transmitting the SCDC status read message to the source device. The source device may read (or obtain) the power-ready information or reception power information by reading the status field (or a status register "status_1 register"), spaced apart from 0x54 of the sink device having the slave address of 0x54 at an interval of 0x41, based on the SCDC status read message.

If the power-ready information obtained from the sink device is "1", the source device may determine that the sink device has been ready to receive a power level supported by the source device and may be ready for or may wait for power transmission. In an embodiment, if a power level indicated by the reception power information obtained from the sink device is the same as that supported by the source device, the source device determines that the sink device has been ready for power reception, and is ready for or waits for power transmission.

Finally, the source device transmits power of the matched power level, and the sink device receives the corresponding power (S18090).

FIG. 19 is a flowchart illustrating a method for transmitting and receiving power through an HDMI according to a fourth embodiment of the present invention. In particular, FIG. 19 is a flowchart regarding an embodiment in which the source device operates as a PSink device and the sink device operates as a PSource device. In this case, the source device matches up pieces of power characteristic information.

The description given in relation to FIG. 16 may be identically applied to the flowchart of FIG. 19. In particular, steps S19000~S19050 of FIG. 19 correspond to steps S16000~S16050 of FIG. 16, respectively, and steps S19080 and S19090 thereof correspond to steps S16080 and S16090 of FIG. 16, respectively. Accordingly, differences between the flowchart of FIG. 19 and the flowchart of FIG. 16 are chiefly described, and thus a redundant description thereof is omitted.

Referring to FIG. 19, step S16070 in which the pieces of power characteristic information are matched up in n FIG. 16 may be performed by the source device not the sink device (S19060). The source device may compare/match up reception power characteristic information of the sink device, obtained through EDID with support power characteristic information of the source device, and may transmit the matched power characteristic information to the sink device (S19070). In this specification, the matched power characteristic information may also be called matched power capability information.

The matched power characteristic information (or matching power characteristic information) includes power level information matched between support power characteristic information about a power level supported by the source device and reception power characteristic information about a power level received by the sink device. In other words, the matched power characteristic information includes a power level that belongs to power levels capable of being received by the sink device and that is matched with a power level capable of being supported by the source device. For example, if the reception power characteristic information of the sink device includes 5 W and 10 W and the support power characteristic information of the source device includes 10 W and 20 W, matched power characteristic information includes 10 W. In this specification, this may be represented as "the matched power characteristic information indicates (or includes/denotes) a power level matched between the source device and the sink device."

In this case, the matched power characteristic information is also transmitted by the source device, and may correspond to one of power levels included in the support power characteristic information of the source device. Accordingly, in this specification, the matched power characteristic information may also be called support power characteristic information. The reason for this is that the matched power characteristic information also corresponds to power characteristic information supported by the source device. In this case, if the source device has additionally performed power characteristic matching, this may also be called matched power characteristic information, if necessary.

The sink device may be prepared to receive power of a level matched with that of the source device as described above, and may notify the source device that it has been ready to receive power (S19080). Finally, the source device transmits the power of the matched level to the sink device (S19090).

In some embodiments, some of the steps included in this flowchart may be omitted or a new step may be added to the steps, and the sequence of the steps may be changed. Furthermore, some of the steps included in the flowchart may be performed as subsequent procedures connected to some steps included in a flowchart to be described later, or may be performed as prior procedures performed prior to the steps.

An embodiment in which steps S19070 and S19080 are performed using the SCDCS of the sink device is described in more detail below with reference to FIGS. 20 and 21.

FIG. 20 is a flowchart illustrating the method for transmitting and receiving power through an HDMI according to the fourth embodiment of the present invention, and shows a method for transmitting and receiving power using the SCDC (or SCDCS).

FIG. 20 is a diagram, in more detail, illustrating the method for performing step S19070 of FIG. 19 using the SCDC. Steps S20000~S20060 and S20080~S20090 of FIG. 20 correspond to steps S19000~S19060 and S19080~19090 of FIG. 19, respectively, and thus a redundant description thereof is omitted. Furthermore, the description given in relation to FIG. 17 may be applied to this figure identically or similarly.

In step S19070 (corresponding to step S20070) of FIG. 19, the source device transmits the matched power characteristic information to the sink device in order to transmit proper power. This may be performed using the SCDC and is described below.

To this end, in an embodiment of the present invention, power delivery configuration registers are configured in the SCDCS. The power delivery configuration register may also be called a power support register. The power delivery configuration registers may be configured using the same registers as those described with reference to FIGS. 10 to 15 or may be configured using registers different from those described with reference to FIGS. 10 to 15. If the power delivery configuration registers are configured using registers different from those described with reference to FIGS. 10 to 15, the power delivery configuration registers described with reference to FIGS. 10 to 15 may be classified as power "request" registers, and the power delivery configuration registers described with reference to FIGS. 16 to 22 may be classified as power "support" registers. The power "request" registers and the power "support" registers may have different offsets.

The matched power characteristic information may be implemented in the form of an SCDC write message.

The source device may transmit the SCDC write message, indicating that power matched with that in the SCDC of the sink device should be configured, to the sink device (S20070). An embodiment of the SCDC write message for configuring power information is the same as that of FIG. 20(a), and the SCDC write message includes the matched power characteristic information described with reference to FIG. 19.

The SCDC write message for configuring the power characteristic information in FIG. 20(a), that is, the matched power characteristic information, may include an offset field "Sub-Address=power request register offset" indicative of the location of the power delivery configuration registers in the SCDCS and a data field "Data=Required Voltage; matched power information" indicative of the matched power level. In other words, the matched power characteristic information may include the offset information of the power delivery configuration registers and the matched power characteristic information.

In this case, the transmitted matched power characteristic information may be signaled so that it includes the power level matched between the source device and the sink device in a volt unit (V) or a watt unit (W). For example, if an electric current transmitted by the source device is fixed to a constant level, the matched power characteristic information may be signaled so that it includes the power level matched between the two devices in a volt unit. If an electric current transmitted by the source device is not fixed to a constant level, however, the matched power characteristic information may be signaled so that it includes the power level matched between the two devices in a watt unit. The matched power characteristic information signaled as described above is included in the SCDC write message and transmitted to the sink device.

FIG. 20(b) shows an embodiment of the power delivery configuration registers. In an embodiment, the reserved offset "Reserved for Configuration (0x31-0x3F) or Reserved (All remaining Offsets)" of the SCDCS may be allocated to the offset of the power delivery configuration registers.

The sink device that has received the SCDC write message may write the matched power characteristic information, included in the SCDC write message, in the power delivery configuration registers. In this case, the matched power characteristic information may be written in the power delivery configuration registers in a volt unit or watt unit. For example, if the matched power characteristic information is signaled and received in a volt unit, it may be written in the power delivery configuration registers in a volt unit. If the matched power characteristic information is signaled and received in a watt unit, it may be written in a watt unit.

More specifically, for example, referring to FIG. 20(b), if the matched power characteristic information is written in a volt unit, the bits 0~4 of the power delivery configuration registers may be allocated to write the matched power characteristic information. In this case, the bits 0~4 may correspond to 3.3 V, 5 V, 9 V, and 12 V or a vendor-defined field, respectively. The sink device may write the matched power characteristic information, received from the source device, in the SCDCS by setting the bit value of a field, corresponding to the matched power level, to "1." If a field corresponding to the matched power level (i.e., a volt unit) is not present in the power delivery configuration registers, the sink device may set the bit value of the vendor-defined field to "1", and may directly write the matched power level in a vendor-defined voltage register of FIG. 20(c) to be described below.

FIG. 20(c) shows an embodiment of the vendor-defined voltage register. The offset of the vendor-defined voltage register may be allocated to the reserved offset "Reserved for Configuration (0x31-0x3F) or Reserved (All remaining Offsets)" of the SCDCS. A plurality of bits may be allocated to the vendor-defined voltage register in order to indicate a different voltage (e.g., a vendor-defined voltage) not indicated in the power delivery configuration registers.

Referring to FIG. 20(c), the bits 0~7 of the vendor-defined voltage register may be allocated to write the vendor-defined voltage. The bits 7~3 of the bits 0~7 may be allocated to indicate a voltage of up to 12 V in a resolution 1 V unit, and the bits 2~0 thereof may be allocated to indicate a voltage in a resolution 0.2 V unit. For example, in the bits 7~3, 0001 may be indicative of 1 V, 0010 may be indicative of 2 V, and 0011 may be indicative of 3 V. In the bits 2~0, 000 may be indicative of 0.0 V, 001 may be indicative of 0.2 V, and 010 may be additionally indicative of 0.4 V.

For another example, although not shown in this figure, if the matched power characteristic information is signaled in a watt unit, bits 0~3 of the power delivery configuration registers may be allocated to write the matched power characteristic information. In this case, the bits 0~3 may correspond to 0 W, 10 W, and 20 W or a vendor-defined field, respectively. The sink device may write the matched power characteristic information in the SCDCS by setting the bit value of a field, corresponding to the power level matched with that of the source device, to "1." If a field corresponding to the power level matched with that of the source device is not present in the vendor-defined voltage register, the sink device may set the bit value of the vendor-defined field to "1", and may directly write the power level matched with that of the source device explicitly using the vendor-defined voltage register as in FIG. 20(c).

If the matched power characteristic information is written in the power delivery configuration registers in a byte unit not a bit unit (i.e., if all the bits 0~7 of the power delivery configuration registers are allocated to write the matched power characteristic information), the sink device may explicitly write a value, corresponding to the power level matched with that of the source device, in the power delivery configuration registers as the matched power characteristic information. For example, the sink device may write "0" (00000000) in the power delivery configuration registers if the power level matched with that of the source device is 0 W, may write "1" (00000001) in the power delivery configuration registers if the power level matched with that of the source device is 10 W, and may write "2" (00000010) in the power delivery configuration registers if the power level matched with that of the source device is 20 W.

As described above, the source device may transmit the SCDC write message, including the power level matched with that of the sink device, to the sink device. The source device may write the power level matched between the two devices in the SCDCS registers of the sink device in a volt or watt unit through the SCDC write message. The sink device may obtain the matched power characteristic information through the SCDCS registers, and may be prepared to receive power of at least one of power levels indicated by the obtained matched power characteristic information (S20080). Furthermore, the source device may transmit the power of the corresponding level to the sink device (S14090). If a plurality of power levels matched between the source device and the sink device is present, the source device may transmit the highest power for efficiency or may transmit middle or low power for stability. This may be determined by the predetermined setting of the control unit.

FIG. 21 is a flowchart illustrating the method for transmitting and receiving power through an HDMI according to the fourth embodiment of the present invention, and shows a method for transmitting and receiving power using the SCDC.

FIG. 21 is a diagram, in more detail, illustrating a method for performing step S19080 of FIG. 19 using the SCDC. Steps S21000~S21070 and S21090 of FIG. 21 correspond to steps S19000~S19070 and S19090 of FIG. 19, respectively, and thus a redundant description thereof is omitted. Furthermore, the description given in relation to FIG. 18 may be applied to this figure identically or similarly.

In step S19080 (corresponding to S21080-1 and S21080-2) of FIG. 19, the sink device may notify the source device that it has been ready to receive the power of a level matched with that of the source device. This may be performed using the SCDC and is described below. To this end, in an embodiment of the present invention, power-ready information or reception power information is implemented in the status flag register of the SCDCS. Furthermore, a response to the matched power characteristic information is implemented in the form of an SCDC read message.

The sink device may notify the source device that the power-ready information or the reception power information has been updated and that the source device may read the updated information from the SCDCS by transmitting an SCDC update read message (S21080-1) and transmitting an SCDC status read message (S21080-2). In this case, the power-ready information or the reception power information may be included in a status flag register as a single field, and may have a bit size of 1 bit or more.

FIG. 21(a) shows an embodiment of the status flag register. In an embodiment, the status flag register may include the power-ready ("power_ready") information or the reception power information. In an embodiment, the power-ready information or the reception power information may be located at the offset 0x41 of the SCDCS.

The power-ready information may indicate whether the sink device is capable of receiving power of a level matched with that of the source device. If the sink device is capable of receiving power of a level matched with that of the source device and/or has been ready to receive the power of the matched level, it may update the value of a field corresponding to the power-ready information with "1." In this case, the sink device may notify the source device of the update of the power-ready information by transmitting the SCDC update read message to the source device (S21080-1), and may transmit the SCDC status read message to the source device (S21080-2). Accordingly, the source device may read the updated power-ready information and transmit the power (S21090).

The reception power information may indicate the amount of power received (or consumed) by the sink device or the amount of power being received by the sink device. If the sink device has been ready to receive power of a level matched with that of the source device, it may write (or update) the reception power information indicative of a power level to be received in the status flag register. Accordingly, the power level indicated by the reception power information written in the status flag register may be the same as that indicated by the matched power characteristic information.

A method for writing the reception power information in the status flag register may be the same as the method for writing the matched power characteristic information in the power delivery configuration registers, which has been described with reference to FIG. 20. Accordingly, the reception power information may indicate the power level to be received/received/being received by the sink device in a volt or watt unit, and may be written in the status flag register in a bit unit or a byte unit.

As described above, if the sink device directly writes reception power information about a power level capable of being received by the sink device in the SCDCS explicitly, it can be stably supplied with power from the source device and can negotiate with the source device about a power level in real time, as described above with reference to FIG. 12.

FIG. 21(b) shows the SCDC update read message. The SCDC update read message includes the address "Slv Addr=0x54" of the sink device and update information "Update_0 and Update_1." The sink device may notify the source device that an update has occurred in the SCDCS of the sink device by transmitting the SCDC update read message to the source device.

FIG. 21(c) shows the SCDC status read message. The SCDC status read message may include address information "Slv Addr=0x54" of the sink device, the register value "0x41" of information to be read, and information about data to be read "Data=0x04 or 0x02 or 0x01." The sink device may notify the source device of an updated status field by transmitting the SCDC status read message to the source device. The source device may read (or obtain) power-ready information or reception power information by reading the status field (or a status register "status_1 register"), spaced apart from 0x54 of the sink device having the slave address of 0x54 at an interval of 0x41, based on the SCDC status read message.

If the power-ready information obtained from the sink device is "1", the source device may determine that the sink device has been ready to receive the power of the matched level and may be ready for or wait for power transmission. In an embodiment, if a power level indicated by the reception power information obtained from the sink device is the same as the matched power level, the source device determines that the sink device has been ready to receive power and prepares/waits for power transmission.

Finally, the source device transmits the power of the matched power level, and the sink device receives the corresponding power (S21090).

FIG. 22 is a flowchart illustrating a method for transmitting and receiving power through an HDMI according to a fifth embodiment of the present invention. In particular, FIG. 22 is a flowchart regarding an embodiment in which the source device operates as a PSource device and the sink device operates as a PSink device.

The description given in relation to FIG. 16 may be identically applied to the flowchart of FIG. 22. In particular, steps S22000~S22050 and S22090 of FIG. 22 correspond to steps S16000~S16050 and S16090 of FIG. 16, respectively. Accordingly, differences between the flowchart of FIG. 22 and the flowchart of FIG. 16 are chiefly described below, and thus a redundant description thereof is omitted.

Referring to FIG. 22, if the sink device determines that it requires the supply of power (e.g., if the remaining power level of the sink device is a predetermined level or less), it may arrange power delivery by transmitting power delivery request information to the source device (S22060). In this case, the sink device may use an SCDCS to transmit the power delivery request information to the source device. This is described in detail later with reference to FIG. 23.

The power delivery request information may include required power characteristic information of the sink device. The required power characteristic information may be indicative of a power level or the amount of power capable of being requested/received by the sink device. The transmission itself of the required power characteristic information may indicate that the sink device supports power reception. In this specification, the required power characteristic information may indicate the required power level of the sink device in a volt unit or watt unit.

The source device may compare/match the required power characteristic information, received from the sink device, with support power characteristic information supported by the source device. If, as a result of the comparison/matching, power of a level requested by the sink device is found to be supplied, the source device may be ready to supply power to the sink device (S22070). Furthermore, the source device may notify the sink device that it has been ready to supply power of the level requested by the sink device as a response to an arrangement request from the sink device (S22080).

In this case, the source device may notify the sink device that it has been ready to supply power using an SCDC write message. For example, the source device may transmit the SCDC write message for writing a value indicative of the power supply-ready completion of the source device in a specific register that is used to indicate whether the source device has been ready to supply power in the SCDCS of the sink device. The sink device may be aware that the source device has been ready to supply power by reading the specific register updated by the SCDC write message received from the source device.

Furthermore, the source device may initiate power transmission/delivery (S22090). In this case, the source device may transmit power of a level requested by the sink device to the sink device.

In some embodiments, some of the steps included in this flowchart may be omitted or a new step may be added to the steps, and the sequence of the steps may be changed. Furthermore, some of the steps included in the flowchart may be performed as subsequent procedures connected to some steps included in a flowchart to be described later, or may be performed as prior procedures performed prior to the steps.

An embodiment in which step S22060 is performed using the SCDCS of the sink device is described in more detail below with reference to FIG. 23.

FIG. 23 is a flowchart illustrating the method for transmitting and receiving power through an HDMI according to the fifth embodiment of the present invention, and shows a method for transmitting and receiving power using the SCDC.

FIG. 23 is a diagram, in more detail, illustrating a method for performing step S22060 of FIG. 22 using the SCDC. Steps S23000~S23050 and S23070~S23090 of FIG. 23 correspond to steps S22000~S22050 and S22070~S22090 of FIG. 22, respectively, and thus a redundant description thereof is omitted. Furthermore, the description given in relation to FIG. 21 may be applied to this figure identically or similarly.

In step S22060 (corresponding to S23060-1 and S23060-2) of FIG. 22, the sink device may request the source device to supply power. In an embodiment of the present invention, power request information or reception power information is implemented in the status flag register of the SCDCS. Furthermore, the power supply request of the sink device is implemented in the form of an SCDC read message.

In order to request the source device to supply power, the sink device may update the power request information or reception power information included in the status flag register of the SCDCS. Next, the sink device may notify the source device that the power request information or reception power information has been updated and that the source device reads the updated information from the SCDCS by transmitting an SCDC update read message to (S23060-1) and transmitting an SCDC status read message (S23060-2). In this case, the power request information or reception power information may be included in the status flag register as a single field, and may have a bit size of 1 bit or more.

FIG. 23(a) shows an embodiment of the status flag register. In an embodiment, the status flag register may include power request information or reception power information. In an embodiment, the power request information or the reception power information may be located at the offset 0x41 of the SCDCS.

The power request information may indicate whether the sink device has transmitted a power supply request to the source device. If the sink device determines to require the supply of power from the source device, it may update the value of a field, corresponding to the power request information, with "1." In this case, the sink device may notify the source device of the update of the power request information by transmitting the SCDC update read message to the source device (S23060-1), and may transmit the SCDC status read message to the source device (S23060-2) so that the source device can read the updated power request information (S23090).

The reception power information may be indicative of the amount of power or a power level requested by the sink device so that the source device supplies the amount of power or the power level. If the sink device determines to require the supply of power from the source device, it may write (or update) reception power information indicative of the power level to be received by the sink device in the status flag register.

A method for writing the reception power information in the status flag register may be the same as the method for writing the matched power characteristic information in the power delivery configuration registers, which has been described with reference to FIG. 20. Accordingly, the reception power information may indicate the power level required by the sink device from the source device in a volt or watt unit, and may be written in the status flag register in a bit unit or a byte unit.

If the sink device directly writes reception power information about a power level to be received in the SCDCS explicitly as described above, there are advantages in that the sink device can be supplied with power from the source device more stably and can negotiate with the source device about a power level in real time, as described above with reference to FIG. 12.

FIG. 23(b) shows the SCDC update read message. The SCDC update read message includes the address "Sly Addr=0x54" of the sink device and update information "Update_0 and Update_1." The sink device may notify the source device that an update has occurred in the SCDCS of the sink device by transmitting the SCDC update read message to the source device.

FIG. 23(c) shows the SCDC status read message. The SCDC status read message may include address information "Slv Addr=0x54" of the sink device, a register value "0x41" of information to be read, and information about data to be read "Data=0x04 or 0x02 or 0x01." The sink device may notify the source device of an updated status field by transmitting the SCDC status read message to the source device. The source device may read (or obtain) power request information or reception power information by reading the status field (or a status register "status_1 register"), spaced apart from 0x54 of the sink device having the slave address of 0x54 at an interval of 0x41, based on the SCDC status read message.

If the power request information obtained from the sink device is "1", the source device may determine a power level to be supplied to the sink device based on the reception power characteristic information of the sink device obtained in step S23050, and may be ready for or wait for the transmission of power of the determined power level. In an embodiment, if power of a power level indicated by the reception power information obtained from the sink device can be supplied, the source device may be ready for or wait for the transmission of power of the corresponding power level.

In this specification, the expression "power is supplied" or derivatives thereof may mean that power is supplied, supported, transmitted or delivered. The expression "power is receive" or derivatives thereof may mean that power is consumed. However, the present invention is not limited to the expressions, and all of various expressions to indicate an operation for supplying power from a specific device to another device may be applied to this specification.

Furthermore, the drawings have been divided and described for convenience of a description, but the embodiments described with reference to the drawings may be merged and designed to implement new embodiments. Furthermore, the present invention is not limited and applied to the configurations and methods of the aforementioned embodiments, but some or all of the embodiments may be selectively combined and configured so that the embodiments are modified in various ways.

Furthermore, although some embodiments of this specification have been illustrated and described above, this specification is not limited to the aforementioned specific embodiments, and a person having ordinary skill in the art to which this specification pertains may modify the present invention in various ways without departing from the gist of the claims. Such modified embodiments should not be individually interpreted from the technical spirit or prospect of this specification.

MODE FOR INVENTION

Various embodiments are described in Best mode for invention.

INDUSTRIAL APPLICABILITY

The present invention is used in a series of the HDMI fields.

It is apparent to an ordinary skilled person in the art that various modifications and changes may be made without departing from the spirit and scope of the present invention. Accordingly, the present invention is intended to include the modifications and changes of the present invention within the attached claims and the equivalent scope.

The invention claimed is:

1. A sink device for transmitting and receiving power with a source device using a High Definition Multimedia Interface, HDMI, the sink device comprising:
    a receiver configured to transmit and receive data through the HDMI;
    a power control unit configured to control a supply of power through the HDMI; and
    a control unit configured to control the receiver and the power control unit,
    wherein the sink device is configured to:
        connect to the source device through the HDMI;
        receive a +5 V signal from the source device;
        transmit a Hot Plug Detect, HPD, signal to the source device; and
        transmit, to the source device, Extended Display Identification Data, EDID, information, and
    wherein, when the EDID information comprises power delivery support information of the sink device, the sink device is further configured to:
        receive, from the source device, a first Status and Control Data Channel, SCDC, write message comprising required power characteristic information related to a first power level requested by the source device;

write the required power characteristic information in power delivery configuration registers of a Status and Control Data Channel Structure, SCDCS;

write transmission power information related to a second power level capable of being supplied by the sink device in a status flag register of the SCDCS;

transmit the written transmission power information to the source device; and transmit the power of the second power level to the source device.

2. The sink device of claim 1, wherein the power delivery support information comprises support power characteristic information related to a power level supported by the sink device for the source device.

3. The sink device of claim 2, wherein the power delivery support information is transmitted in an HDMI Forum-Vendor Specific Data Block, HF-VSDB, form.

4. The sink device of claim 1, wherein the first power level and the second power level have an identical level.

5. The sink device of claim 4, wherein, when the sink device writes the transmission power information in the status flag register, the sink device is configured to write the transmission power information related to the second power level identical with the first power level when the sink device is capable of transmitting the first power level.

6. The sink device of claim 1, wherein, when the EDID information comprises power reception support information, the sink device is further configured to:

receive, from the source device, a second SCDC write message comprising support power characteristic information related to a third power level capable of being supplied to the sink device by the source device;

write the support power characteristic information in power delivery configuration registers of the SCDCS; and receive power of the third power level from the source device, wherein the power reception support information comprises reception power characteristic information related to a power level received by the sink device from the source device, and wherein the power reception support information is transmitted in an HF-VSDB form.

7. The sink device of claim 6, wherein the sink device is further configured to write reception power information related to a fourth power level consumed by the sink device in the status flag register of the SCDCS.

8. A source device for transmitting and receiving power with a sink device using a High Definition Multimedia Interface, HDMI, the source device comprising:

a transmitter configured to transmit and receive data through the HDMI;

a power control unit configured to control a supply of power through the HDMI; and a control unit configured to control the transmitter and the power control unit, wherein the source device is configured to:
connect with the sink device through the HDMI;
transmit a +5 V signal to the sink device;
receive a Hot Plug Detect, HPD, signal from the sink device; and
receive Extended Display Identification Data, EDID, information, and wherein, when the EDID information comprises power delivery support information of the sink device, the source device is further configured to:
transmit, to the sink device, a first Status and Control Data Channel, SCDC, write message comprising required power characteristic information related to a first power level requested by the source device;
receive transmission power information related to a second power level capable of being supplied by the sink device; and
receive the power of the second power level from the sink device.

9. The source device of claim 8, wherein the power delivery support information comprises support power characteristic information related to a power level supported by the sink device for the source device, and wherein the power delivery support information is received in an HDMI Forum-Vendor Specific Data Block, HF-VSDB, form.

10. The source device of claim 8, wherein the source device is further configured to compare the first power level with the second power level to check whether the first power level and the second power level are matched.

11. The source device of claim 8, wherein the first power level and the second power level have an identical level.

12. The source device of claim 8, wherein, when the EDID information comprises power reception support information, the source device is further configured to:

transmit, to the sink device, a second SCDC write message comprising support power characteristic information related to a third power level capable of being supplied to the sink device by the source device; and transmit power of the third power level to the sink device.

13. The source device of claim 12, wherein the power reception support information comprises reception power characteristic information related to a power level received by the sink device from the source device, and wherein the power reception support information is transmitted in an HF-VSDB form.

14. A method for transmitting power between a source device and a sink device using a High Definition Multimedia Interface, HDMI, the method comprising:

connecting the sink device with the source device through the HDMI;

receiving, at the sink device, a +5 V signal from the source device;

transmitting, by the sink device, a Hot Plug Detect, HPD, signal to the source device; and transmitting, by the sink device to the source device, Extended Display Identification Data, EDID, information, wherein, when the EDID information comprises power delivery support information of the sink device, the method further comprises:

receiving, at the sink device from the source device, a first Status and Control Data Channel, SCDC, write message comprising required power characteristic information related to a first power level requested by the source device;

writing the required power characteristic information in power delivery configuration registers of a Status and Control Data Channel Structure, SCDCS;

writing transmission power information related to a second power level capable of being supplied by the sink device in a status flag register of the SCDCS;

transmitting, by the sink device, the written transmission power information to the source device; and transmitting, by the sink device, the power of the second power level to the source device.

15. A method for transmitting power between a source device and a sink device using a High Definition Multimedia Interface, HDMI, the method comprising:
   connecting the source device with the sink device through the HDMI;
   transmitting, from the source device, a +5 V signal to the sink device;
   receiving, at the source device, a Hot Plug Detect, HPD, signal from the sink device; and
   receiving, at the source device, Extended Display Identification Data, EDID, information;
   wherein, when the EDID information comprises power delivery support information of the sink device, the method further comprises:
      transmitting, by the source device to the sink device, a first Status and Control Data Channel, SCDC, write message comprising required power characteristic information related to a first power level requested by the source device;
      receiving, at the source device, transmission power information related to a second power level capable of being supplied by the sink device; and
      receiving, at the source device, the power of the second power level from the sink device.

* * * * *